US006731569B2

(12) United States Patent
Yurchenko et al.

(10) Patent No.: US 6,731,569 B2
(45) Date of Patent: May 4, 2004

(54) METHODS FOR REDUCING RINGING OF ULTRASONIC TRANSDUCERS

(75) Inventors: Oleksandr V. Yurchenko, Kiev (UA); Wilbur E. DuVall, Kimberling City, MO (US); Wendell C. Johnson, Signal Hill, CA (US)

(73) Assignee: Automotive Technologies International Inc., Denville, NJ (US)

(*) Notice: Subject to any disclaimer, the term of this patent is extended or adjusted under 35 U.S.C. 154(b) by 0 days.

(21) Appl. No.: 10/208,522

(22) Filed: Jul. 30, 2002

(65) Prior Publication Data

US 2003/0039173 A1 Feb. 27, 2003

Related U.S. Application Data

(63) Continuation-in-part of application No. 10/100,282, filed on Mar. 18, 2002, now abandoned.
(60) Provisional application No. 60/276,461, filed on Mar. 16, 2001.

(51) Int. Cl.[7] .................................................. G01S 15/00
(52) U.S. Cl. ......................................... 367/138; 367/903
(58) Field of Search ................................. 367/903, 138, 367/135, 901

(56) References Cited

U.S. PATENT DOCUMENTS

| | | | | |
|---|---|---|---|---|
| 4,122,725 A | * 10/1978 | Thompson | .................. | 73/632 |
| 5,267,219 A | 11/1993 | Woodward | .................. | 367/99 |
| 5,483,501 A | * 1/1996 | Park et al. | .................. | 367/140 |

OTHER PUBLICATIONS

Influence of Pulse Drive Shape and Tuning on the Broadband Response of a Transducer, Ron McKeighen, Proc. IEEE Ultrasonics Symposium, vol. 2, pp. 1637–1642, 1997.

The Design of Broadband and Efficient Acoustic Wave Transducers, C.H. Chou et al., 1980 Ultrasonics Symposium, Nov. 4–7, 1980.

* cited by examiner

*Primary Examiner*—Daniel T. Pihulic
(74) *Attorney, Agent, or Firm*—Brian Roffe

(57) ABSTRACT

Methods for reducing ringing of dual-function ultrasonic air-coupled transducers in which at least one electrical passive circuit is applied to the transducer. The circuit may be either a linear circuit or a non-linear circuit. Different circuits can be applied to the transducer when the transducer is in a transmission mode than when the transducer is in a reception mode.

27 Claims, 37 Drawing Sheets

METHODS FOR REDUCING RINGING OF ULTRASONIC TRANSDUCERS

CROSS-REFERENCE TO RELATED APPLICATIONS

This application is a continuation-in-part of U.S. patent application Ser. No 10/100,282 filed Mar. 18, 2002, now abandoned.

This application claims priority of U.S. provisional patent application Ser. No. 60/276,461 filed Mar. 16, 2001 through U.S. patent application Ser. No. 10/100,282 filed Mar. 18, 2002.

FIELD OF THE INVENTION

The present invention relates to electrical means and methods for reducing or suppressing ringing of ultrasonic transducers, and more particularly, to the design and construction of electrical circuits to suppress ringing of ultrasonic air-coupled resonant transducers.

BACKGROUND OF THE INVENTION

Occupant sensors are now being used on production automobiles that make use of ultrasonic transducers in a system to locate and identify the occupancy of the front passenger seat of an automobile to suppress deployment of an airbag if the seat is empty, if a rear facing child seat is present or if an occupant is out-of position, that is so close to the airbag that the deployment is likely to cause greater injury to the occupant than its non-deployment. Depending on the particular design, an occupant can get quite close to the transducers, sometimes as close as 10 cm.

Ultrasonic transducers can be used both to send and to receive ultrasonic waves. However, commercially available ultrasonic transducers, such as the Murata MA40S4R/S, due to their high quality factor Q continue to emit ultrasound even after all power to the transducer has been turned off. As a result, residual electrical oscillations at the transducer terminals deteriorate and mask weak received signals. This is known as ringing and is similar to the sound that a bell continues to emit after it has been struck.

This ringing prevents the use of such a transducer as a receiver until the ringing has subsided to the point that the received waves exceed the magnitude of the waves being emitted. Such transducers effectively cannot sense a reflection from a target closer that some particular distance from the transducer depending on the amount of ringing, which for a standard MuRata transducer may be as much as about 30 cm. Thus, when it is necessary to sense the presence of an object closer than the ringing zone, ultrasonic systems heretofore have required that the transducers be used in pairs, one for sending and another for receiving. The requirement to use pairs of transducers increases the cost of the system and occupies valuable real estate in the vehicle. Thus, there is a need of a method to reduce this ringing so as to enable a single transducer to be used both for sending and receiving from targets as close as about 10 cm.

OBJECTS AND SUMMARY OF THE INVENTION

To suppress ringing of off-the-shelf ultrasonic transducers, one can use acoustic/mechanical or electrical means. The latter is simpler and requires less effort. An objective of this invention is to provide electrical passive circuits and/or switching circuits which suppress ringing of a commercially available ultrasonic transducer such as the Murata MA40S4R/S transducer to permit reflections to be sensed from objects located as close as about 10 cm from the transducer. Although MuRata is a well-known supplier of open cone type transducers, there are many manufacturers and suppliers of this and other types of air-coupled resonant transducers, and the invention is equally applicable to them. For example, it may be applied to the APC or Massa air-coupled ultrasonic transducers.

Two types of circuits are used in practicing this invention: a linear circuit, developed on the basis of the Fano theory utilizing the principle of physical feasibility to get a “filter-like” circuit structure (Fano R. M., Theoretical limitations on the broadband matching of arbitrary impedance, Journal of the Franklin Institute, Vol. 249, pp. 57–84 and 139–154 (January–February 1950)), and a non-linear circuit, developed by Automotive Technologies International, Inc. of Rochester Hills, Mich. (ATI).

An important purpose of this invention is to obtain an acceptable ringing of the transducer at a given drive signal using passive electrical components. There is a known general rule that the broader a transducer transfer function is, the shorter is the transducer ringing. Various electrical matching circuits with inductors and capacitors were being applied to the resonant transducers to widen their transfer function (May J. E., Waveguide ultrasonic delay lines, Physical Acoustics, Edited by W. P. Mason, Vol. 1A. Academic Press, NY-London (1964); White D., A transducer with a locking layer and other transducers, Physical Acoustics, Edited by W. P. Mason, Vol. 1B. Academic Press, NY-London (1964)). However, the transfer factor decreases if the characteristic is widened arbitrarily. An example of this is Massa's commercial ultrasonic transducer of E-152 series, which being tuned with an inductor and a resistor has less sensitivity. Inductive circuits were also applied to medical ultrasonic transducers to widen their frequency response and make their impulse response shorter. (R. E. McKeighen, Influence of pulse drive shape and tuning on the broadband response of a transducer, Proc IEEE Ultrasonics Symposium, Vol 2, pp. 1637–1642, IEEE Cat. # 97CH36118, 1997; R. E. McKeighen, Design Guidelines for Medical Ultrasonic Arrays, SPIE International Symposium on Medical Imaging, Feb. 25, 1998, San Diego, Calif.). The author discloses circuits of the specific, low-pass filter structure that were build on the base of finite element simulations and experiments carried out with a concrete type of the medical transducer with lossy backing, that is, with rather low quality factor Q. The impulse shortness is observed at the level of about —30 dB that is enough for this type of transducers but not suitable for air-coupled ones with high Q. The authors also did not achieve any real ringing reduction of the transducer itself, that is, reduction of electrical oscillations at its electrical terminals (electrodes). Also, as far as there is no theory underlying the simulations, the study done is only applicable to the concrete type of the transducer investigated.

The known theories of broadband matching of arbitrary impedance, including Fano's, developed on the basis of physical feasibility approach (Wai-Kai Chen, Theory and Design of Broadband Matching Networks, Pergamon Press, Oxford N.Y. Toronto Sydney Paris Frankfurt, 1976; Matthaei G. L., Young L., Jones E. M. T., Microwave filters, impedance matching networks, and coupling structures, Vol. 1, McGraw-Hill Book Company, NY 1964)) give techniques of how to integrate a lumped model of matched impedance into a filter-like structure, and then to build an optimal matching circuit that provides, for example, a maximum transfer factor at a given bandwidth.

Similar approaches are disclosed in (G. A. Hjellen, J. Andersen, R. A. Sigelmann, "Computer-aided design of ultrasonic transducer broadband matching networks", IEEE Trans on Sonics and Ultrasonics, Vol SU-21, No. 4, PP. 302–305, October, 1974; C. H. Chou, J. E. Bowers, A. R. Selfridge, B. T. Khuri-Yakub, and G. S. Kino. The Design of Broadband and Efficient Acoustic Wave Transducers, Preprint G.L: Report No. 3191 November 1980. Presented at 1980 Ultrasonics Symposium, Nov. 4–7, 1980, Boston, Mass.). In the first case, the authors built a three-element lumped R-L-C model of the high frequency (5.5 MHz) transducer, integrated it in the pass-band filter-like structure with series inductive and capacitive elements, and then applied a parametric synthesis procedure to those elements to get a wide Butterworth-like characteristic of the electrical power absorbed by the transducer. They did not analyze and reduce ringing of the transducer. In the second case, the authors also applied parametric synthesis to high frequency (3 MHz and 35 MHz) lossy backing transducers operating into water, and build reactive matching circuits with inductors and capacitors to get either a desirable frequency response or a compact impulse response of the transducer. They shortened the impulse response of the 35 MHz transducer from 15 full cycles to 3 full cycles. However, they do not disclose neither ringing reduction of the transducer at its electrical terminals nor the drive signal shape at which this compactness of the impulse response was achieved.

One of optimal matching techniques, namely Fano's, being applied to piezo-transducers with low quality factor Q (Yurchenko A. V. Broadband matching of piezo-transducers of acousto-optic devices. Izvestiya VUZ., Radioelektronika, Vol 23, No. 3, pp. 98–101, (1980); Tsurochka B. N., Yurchenko A. V., An electroacoustic device, USSR Author certificate No. 1753586 Int. Cl.$^5$ H03 07/38 (1992)) enabled optimal matching of the transducers within an arbitrary frequency band using parallel/series inductors and capacitors. It is also disclosed (T. L. Rhyne, Method for designing ultrasonic transducers using constraints on feasibility and transitional Butterworth-Thompson spectrum, U.S. Pat. No. 5,706,564) how to design an ultrasonic half-wavelength transducer with a desirable shape of the bandpass characteristic.

None of disclosed techniques suggests what a characteristic shape or bandwidth is desirable to minimize ringing. This is a many parameters task that could be solved in alternative ways depending on what factor is most important for concrete applications. Therefore, to get reduced ringing, one can consider the Murata transducer as a two-port transducer with known input impedance, apply the Fano method to get a bandwidth with acceptable transfer factor and/or an acceptable inductor value, and then smooth the phase characteristic to get acceptable transducer ringing at a given input electrical signal. Such a procedure has been used in this invention to synthesize a linear electrical circuit for ringing reduction. The circuit synthesized has been simulated and then examined experimentally. All of the above references are incorporated herein by reference.

The non-linear circuit has been simulated and the influence of its parameters on ringing reduction was investigated. In both simulations, a conditional Spice model of the Murata transducer MA40S4R/S was built on the basis of the heuristic approach. The measured transducer impedance was used as initial data.

The operation of the transducer in dual-function (i.e., transmitter-receiver) mode is fundamentally different from its transmitter mode. To see the difference, a transducer operating in dual-function mode will be considered in greater detail. In view of the interest in detecting small signals reflected back from a target, a possibility to shorten the ringing zone (dead zone as it is frequently called) will depend on what ringing is present at the electrical input to the transducer. It does not matter much what ringing will be at the transducer acoustic output. The dead zone length will be determined substantially exclusively by the relation of the received signal level to a ringing floor at the transducer electrical side. Although transient processes at the transducer electrical input and its acoustic output are connected due to electromechanical coupling, they are not identical because of the non-symmetry of the electromechanical two-port and different boundary conditions at its electrical and acoustic sides. Thus, the transient electrical process at the input of the transducer should be considered and its level compared with a level of delayed burst detected at the same points of electrical circuit. Such an analysis has been performed using the MicroSim® DesignLab 8.0 (evaluation version) Spice modeling software. Its results are presented below.

Fundamentally, the invention involves the placement of electrical possibly reactive components, inductance or inductors and/or capacitors of appropriate values in parallel/series with the ultrasonic transducer in one case and in series and parallel in the other case. Although these components have been used in the past with ultrasonic transducers they have not been of the proper value to cause a substantial reduction in transducer ringing.

Accordingly, one exemplifying embodiment of a method for reducing ringing of dual-function ultrasonic transducers in accordance with the invention comprises the step of applying at least one inductance in series and/or in parallel to the transducer electrical terminals to obtain a decreased dead zone of the transducer. At least one passive electrical circuit may be applied in series and/or parallel to. the inductance. Also, different electrical passive circuits can be applied to the transducer when the transducer is in a transmission mode than when the transducer is in a reception mode.

Although an "inductance" is applied, it is noted that an "inductor" could also be applied. In the electronics field, "inductance" can be realized with active circuits without any inductors which usually are simply coils. At a large value of inductance, the active circuit could often happen to be cheaper than the coil.

Each passive circuit may be a linear or non-linear circuit. For a linear circuit, the linear circuit can be synthesized using known input impedance/admittance of the transducer. It can also be optimized on the basis of a broadband matching theory. That is, the generator output impedance may be optimized to obtain acceptable ringing at a given input signal. Parametric synthesis of the circuit is also envisioned as an option. Non-linear components may be added to the linear circuit if so desired and/or necessary. The linear circuit could also be constructed with a higher order transfer function and including at least one capacitor and at least one inductor. Thus, the invention contemplates the use of, for example, a second order circuit, or two component circuit, or any other circuit with predefined number of components. Generally, passive electrical circuit can comprise any number of components by definition.

An arrangement in accordance with the invention for reducing ringing of dual-function ultrasonic transducers comprises an electrical passive circuit adapted to be coupled to the transducer, said circuit including at least one inductance adapted to be in series and/or in parallel to the transducer to obtain a decreased dead zone of the transducer.

An additional electrical passive circuit may be adapted to be coupled to the transducer and a switching device provided for switching between the circuit such that one circuit is coupled to the transducer when the transducer is in a transmission mode and the other circuit is coupled to the transducer when the transducer is in a reception mode. Instead of switching between circuits made of different components, a switching device can be built into the circuit to modify the circuit such that a first construction of the circuit is coupled to the transducer when the transducer is in a transmission mode and a second construction of the circuit, different from the first construction, is coupled to the transducer when the transducer is in a reception mode. A similar switching system is described in U.S. Pat. No. 5,267,219 (Steven J. Woodward, Acoustic range-finding system, 1993). In this system, the ringdown time of the transducer is reduced by damping that is provided by switching the transducer on the transistor and/or on an appropriate resistive circuits. No reactive elements, inductors and/or capacitors, are used in the system to shorten ringing time, therefore the net effect in such a resistive system should be worse than in a system with frequency response optimized to get acceptable ringing at a given signal shape.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

To build a Spice model of the Murata transducer means to find the structure of an electrical circuit approximating transfer function of the electromechanical two-port device and find parameters of its components. If the transducer operates in dual-function mode, it is necessary to realize circuits for both transmitter and receiver modes. In this analysis a simplified heuristic procedure is used. The idea is to build the simplest equivalent circuit of the transducer and adapt it to both modes without taking into account real values of the transfer factors, then to build a Spice model of air medium using a delay line from the software library. It was supposed that decay in the medium Spice model would emulate both the transducer transfer factor and loss in air. It was known from experiments that at exciting burst of 20 Vpp, the Murata transducers had received signals of about 20 mV. Therefore, the medium decay was chosen of such a value in order to see a delayed signal at the level of about −60 dB related to the electrical input (16 Vpp). In this way, it was possible to observe and analyze distortions of the received signals caused by both the transducer and a circuit under consideration without having an exact Spice model based on the equations.

Figure 1:
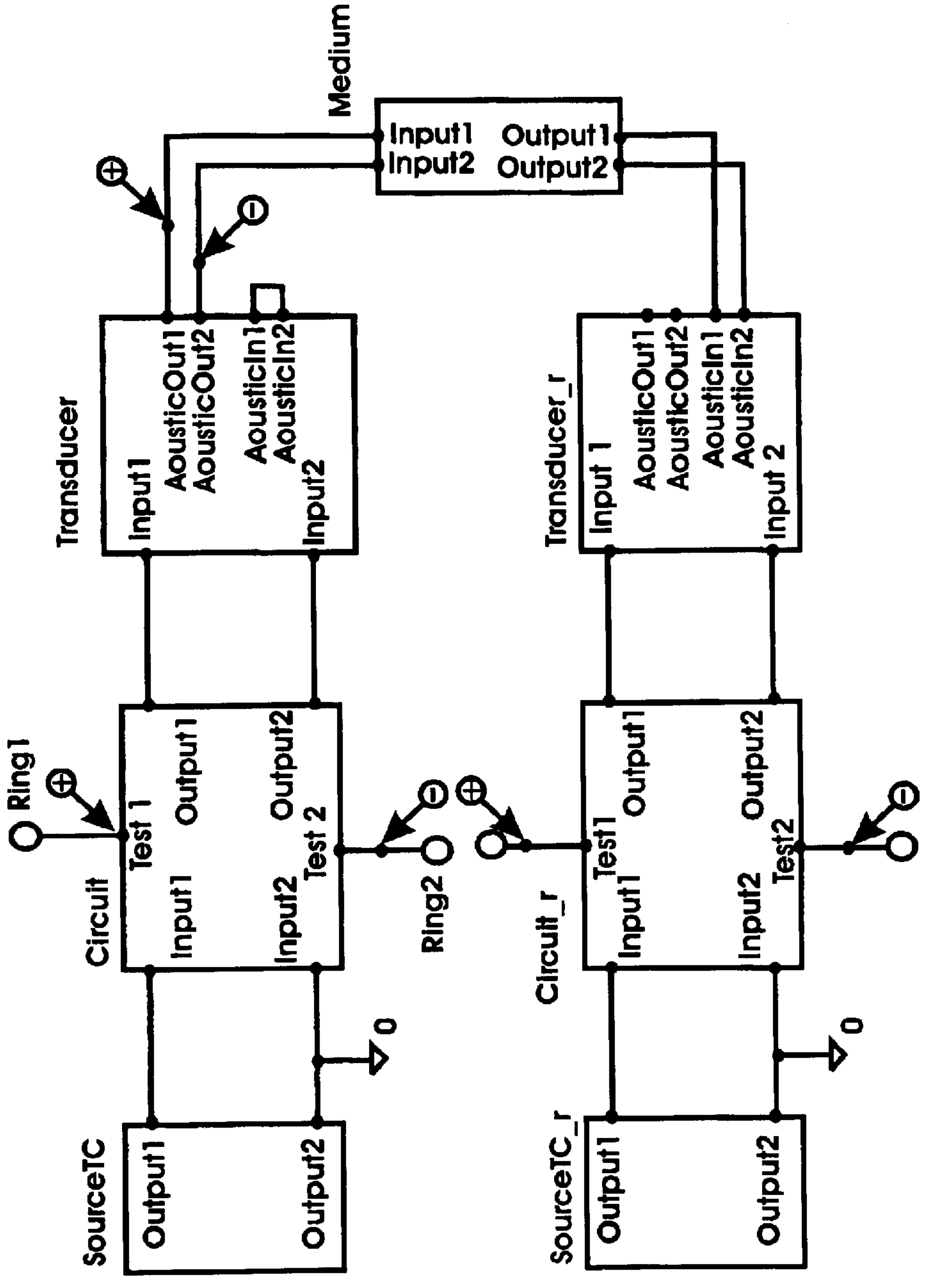
FIG. 1 shows blocks of a Spice model of a transducer together with medium and electrical circuits for ringing reduction.
Figure 2:
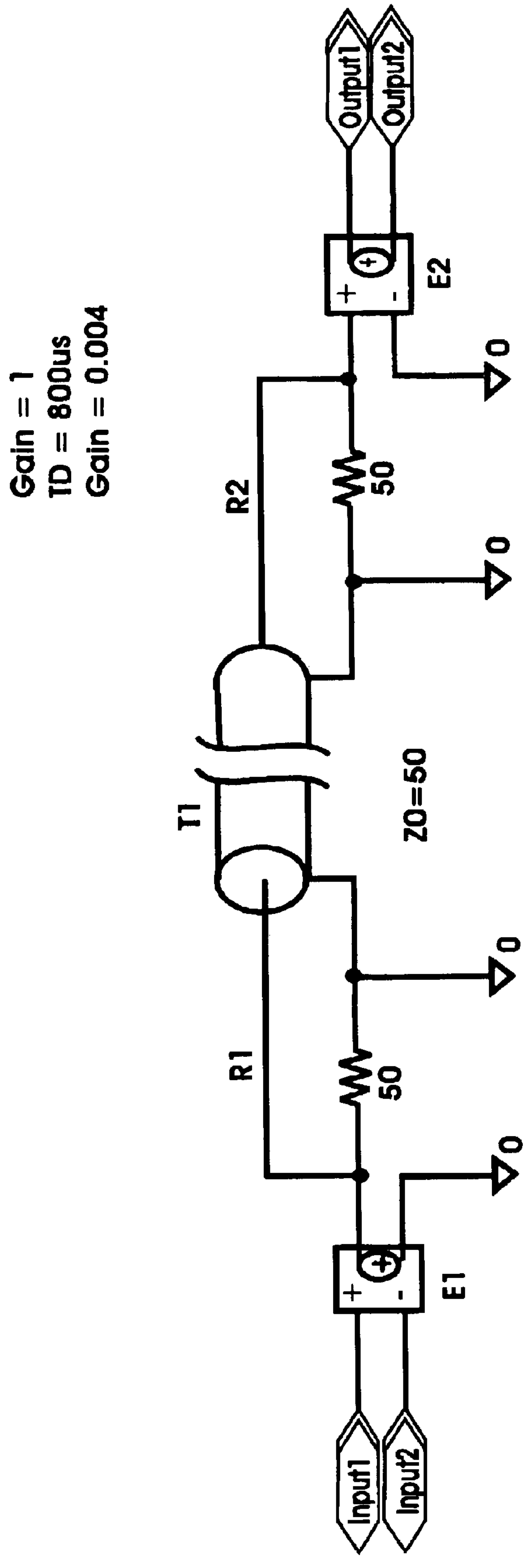
FIG. 2 shows a circuit of the medium Spice model shown in FIG. 1.
Figure 3:
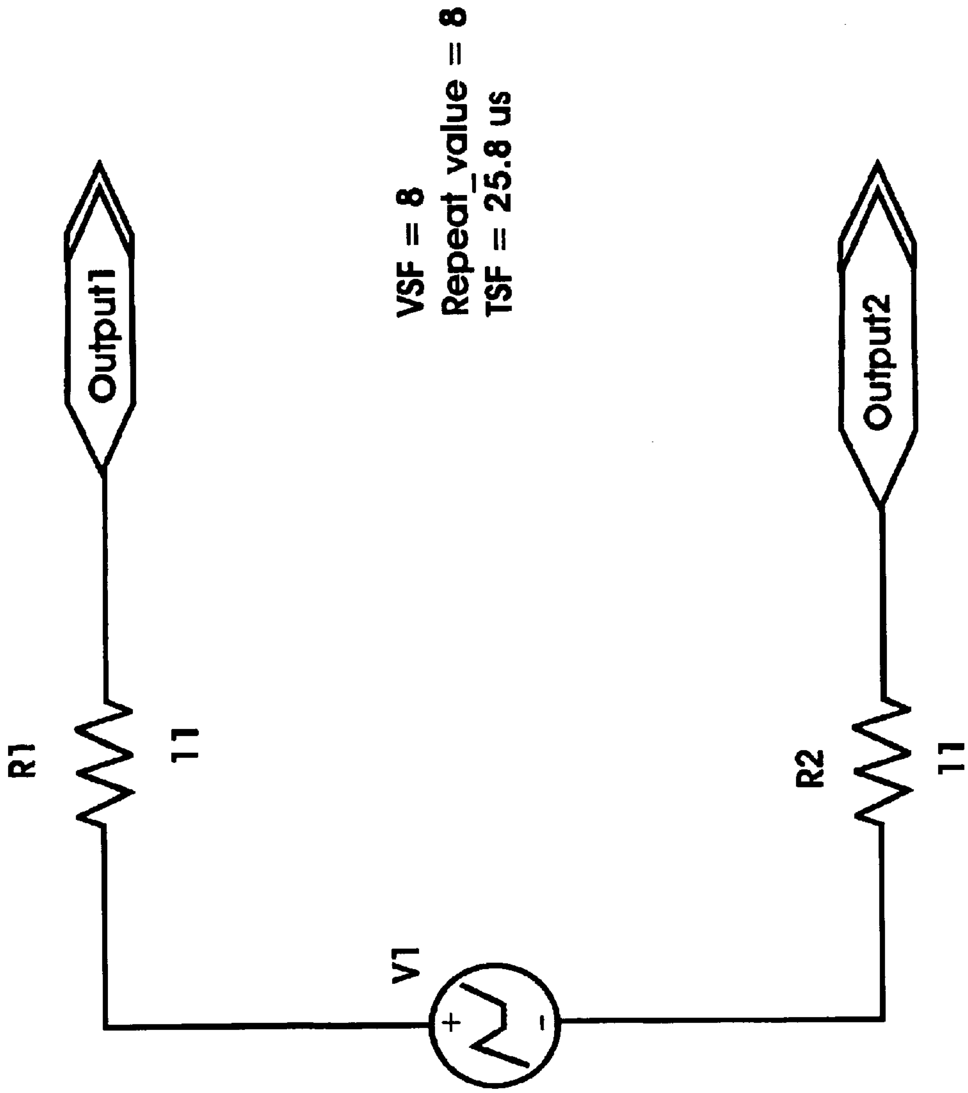
FIG. 3 shows a circuit of the SourceTC/SourceTC_r Spice model shown in FIG. 1.

The common view of the Spice model built is presented in FIG. 1. The model has a block structure. The internal structures of the blocks are determined by its functions. The “Medium” and “SourceTC/SourceTC_r” blocks (shown in FIGS. 2 and 3, respectively) have identical structures in all simulations. Blocks “Transducer” and “Transducer_r” have identical components and structure but the simulating electrical signals are applied to them in different ways depending on the transmitter/receiver modes. The “Circuit”/“Circuits_r” blocks emulate the circuit under consideration, linear or non-linear. They are identical in the same simulation.

The “Medium” Spice model (FIG. 2) has been realized using two voltage-controlled sources E1 and E2, and delay line T1.

Since the MicroSim® software does not have in its library driver TC4426 which is the signal source in the ATI electronics, the “SourceTC/SourceTC_r” Spice model (FIG. 3) has been determined artificially on the basis of documentation on the driver. “SourceTC/ . . . ” that provides "Repeat value"=n cycles of a symmetrical rectangular signal of 16 Vpp across its terminals "Output1,Output2". The cycle duration has been established equal to 25.8 microsec. This corresponds to frequency $f_s$ of dynamic resonance of the transducer that happened to be equal to 38.78 kHz. According to documentation, the driver output resistance is 11+11 Ohm at $V_{DD}$=8 V.

Figure 4:
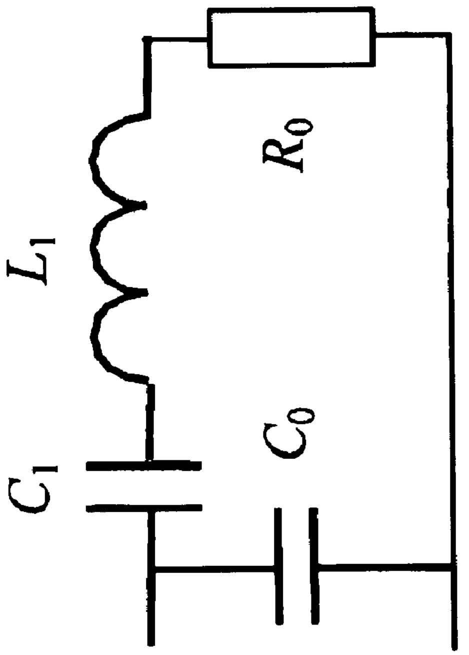
FIG. 4 shows an equivalent circuit of the transducer, which is taken as the equivalent circuit of a piezoelectric resonator.
Figure 6:
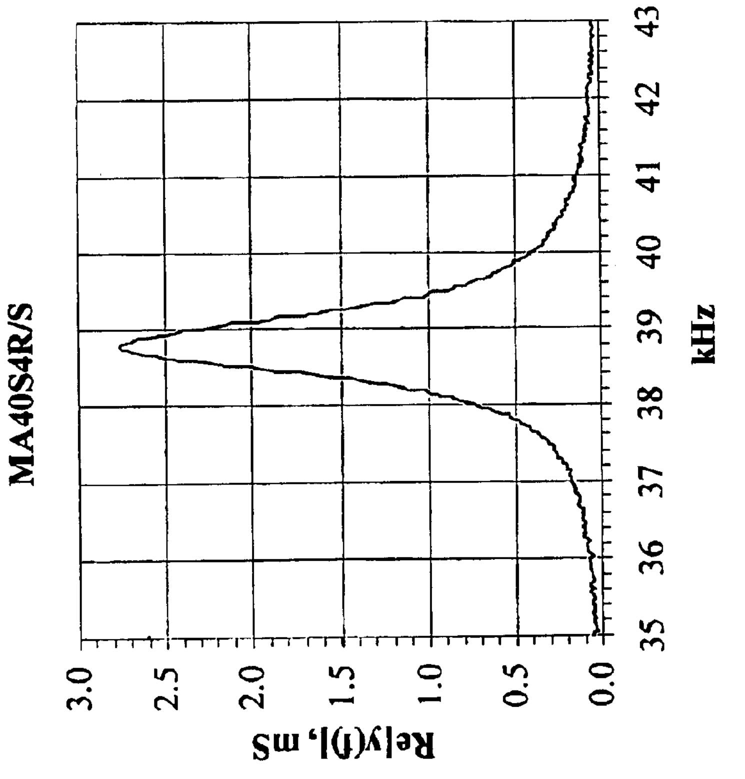
FIG. 6 is a chart of the averaged values of the real part of the measured input admittance of the transducers.
Figure 7:
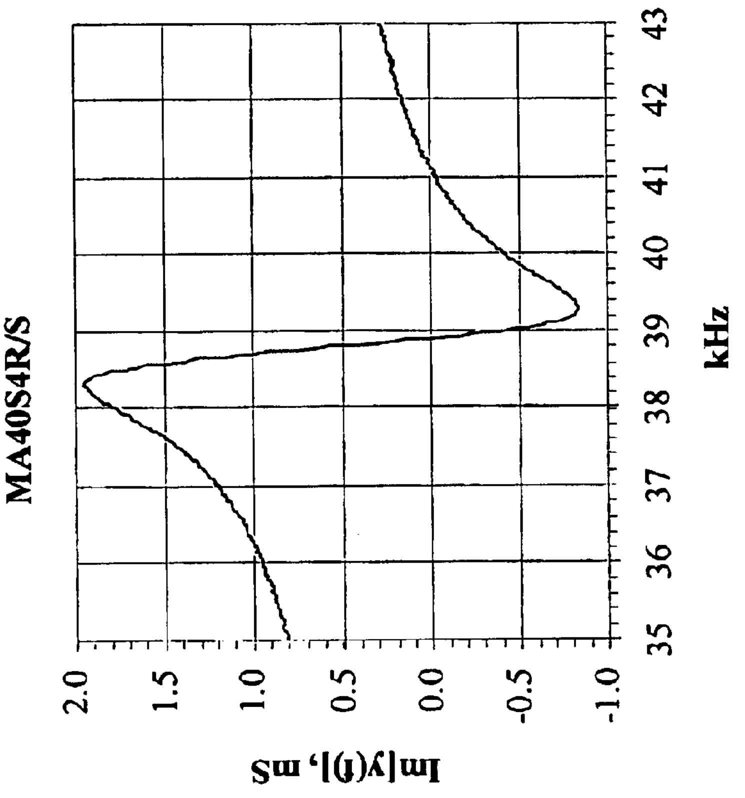
FIG. 7 is a chart of the averaged values of the imaginary part of the measured input admittance of the transducers.

The conventional equivalent circuit (Berlincourt D., Kerran D., Jaffe H., Piezoelectric and piezomagnetic materials, Physical Acoustics, Edited by W. P. Mason, v. 1. Academic Press, NY-London (1964)) of the transducer is just the equivalent circuit of a piezoelectric resonator (FIG. 4). It has been built on the basis of electrical measurements. Complex input admittance y(f) of ten units of the Murata MA40SR/S transducers were measured using a Network Analyzer HP3577A. Averaged results of measurements are presented in FIGS. 6 and 7. The obtained data was interpolated with cubic splines using Mathcad® 2000 software and then used to calculate the equivalent circuit parameters:

$$R_0=Re(y(f_s))^{-1},\ L_1=QR_0/2\pi f_s,\ C_1=1/(2\pi f_s)^2L_1,\ C_0=Im(y(f_s))/2\pi f_s.$$

The dynamic resonance frequency has been found as a frequency that corresponded to maximum of interpolated numeric function Re(y(f)). The Quality factor Q was calculated as $Q=f_s/\Delta f$, where $\Delta f$ was determined at the half level of curve Re(y(f)).

Figure 5:
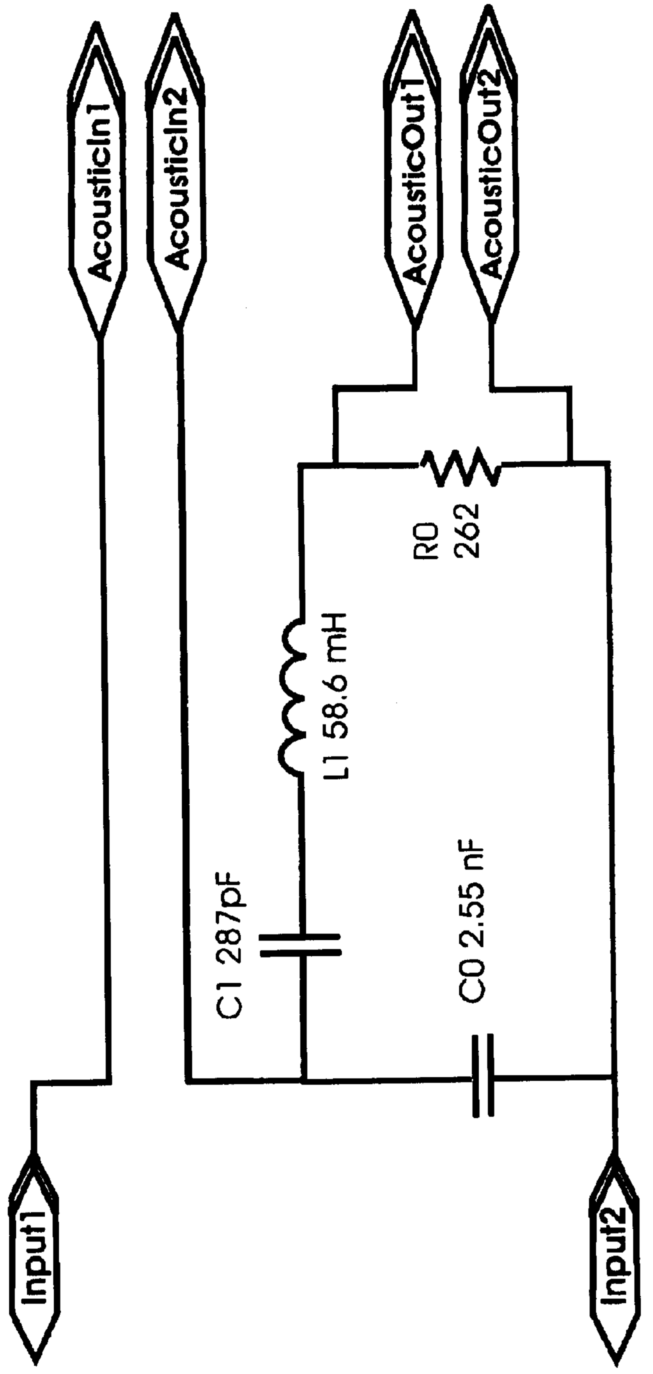
FIG. 5 shows a circuit of the Transducer (transmitting and receiving) Spice models shown in FIG. 1.

The parameters found were $R_0$=362 Ohm, $L_1$=58.6 mH, $C_1$=287 pF, $C_0$=2.55 nF, Q=39. values were used in the transducer Spice model (FIG. 5). It is exactly its equivalent circuit but with two ports (AcoucticOut1, AcousticOut2) and (AcoucticIn1, AcousticIn2) which allows the transducer transmitter or receiver mode to be emulated. The transmitter mode is realized when a short is installed at the port (AcoucticIn1, AcousticIn2) (see FIG. 1). In this case, the "Transducer" two-port emulates the signal transfer from "Circuit" to "Medium". Its first port, (AcoucticOut1, AcousticOut2), emulates acoustic output. To analyze the transducer transfer and transient functions, the total loss resistance is considered instead of true radiation resistance. A small value of the electro-acoustic transfer factor is taken into account in the "Medium" decay.

When the receiver mode is realized, emf, emulating input acoustic signal, is applied to port (AcoucticIn1, AcousticIn2). Port (AcoucticOut1, AcousticOut2) is left open. In this case, the "Transducer_r" two-port emulates the signal transfer from "Medium" to "Circuit".

The "Circuit/Circuit_r" blocks are identical in the transmitter or receiver modes. Their terminals (Ring1, Ring2) and (Test1, Test2) used to test differential signals under consideration are also identical. They are given different names only to distinguish the "Circuit" modes, transmitter or receiver. There is one more port in the total Spice model to test a shape (but not a level!) of the acoustic signal radiated. It is (AcoucticOut1, AcousticOut2) in the "Transducer". Voltage across those three ports is just the signals that had been analyzed while circuits under consideration were being investigated.

The results of the simulation were as follows.

The non-linear circuit will be discussed initially.

Figure 8:
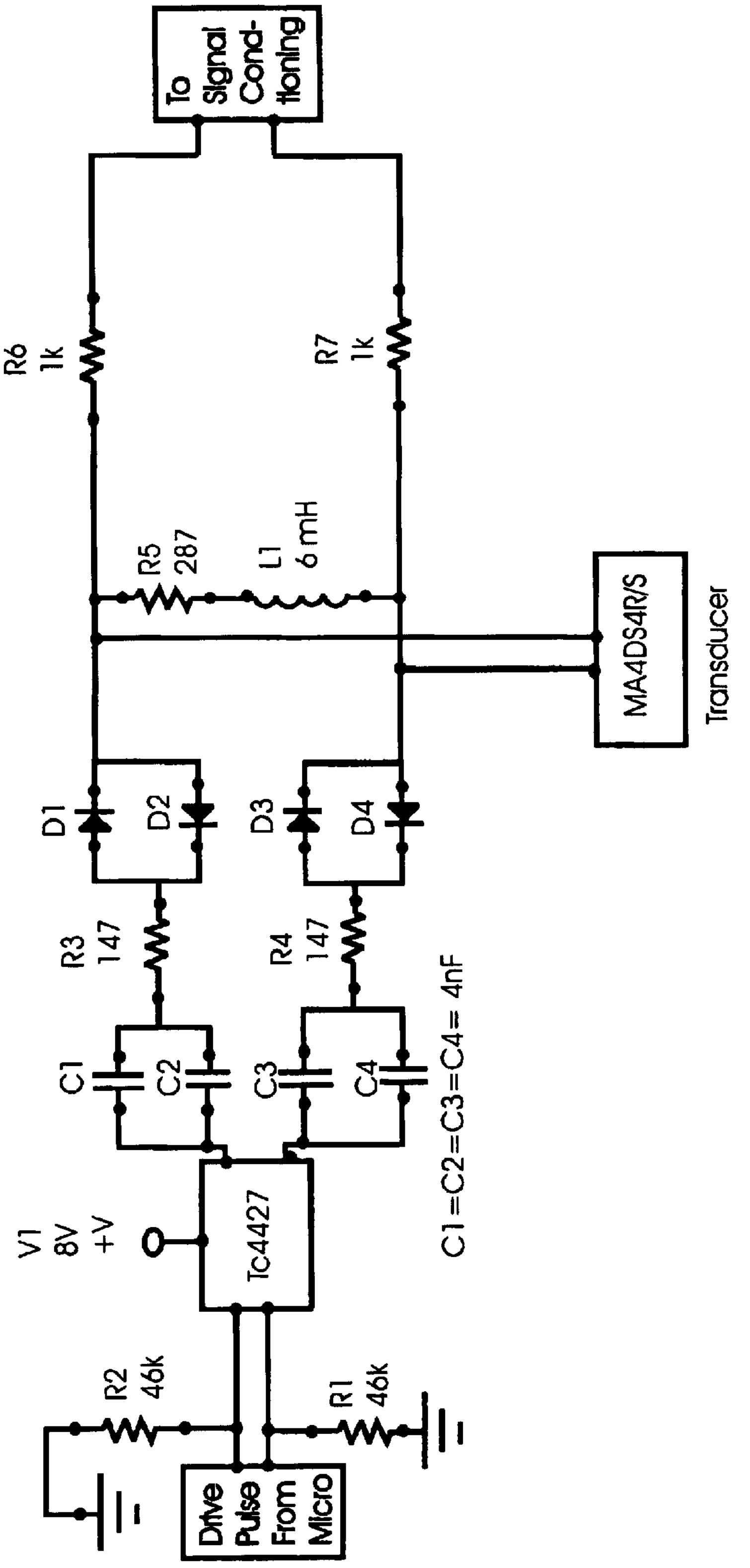
FIG. 8 shows a schematic of a non-linear circuit submitted for analysis.

FIG. 8 shows the non-linear circuit presented for an analysis but with one exception: the Murata transducer MA40S5 was replaced with transducer MA40S4R/S. That was done because transducers MA40S4R/S were available to make measurements. It is believed that the results obtained with transducers MA40S4R/S should not be very different from the results obtained with transducers MA40S5.

Figure 9:
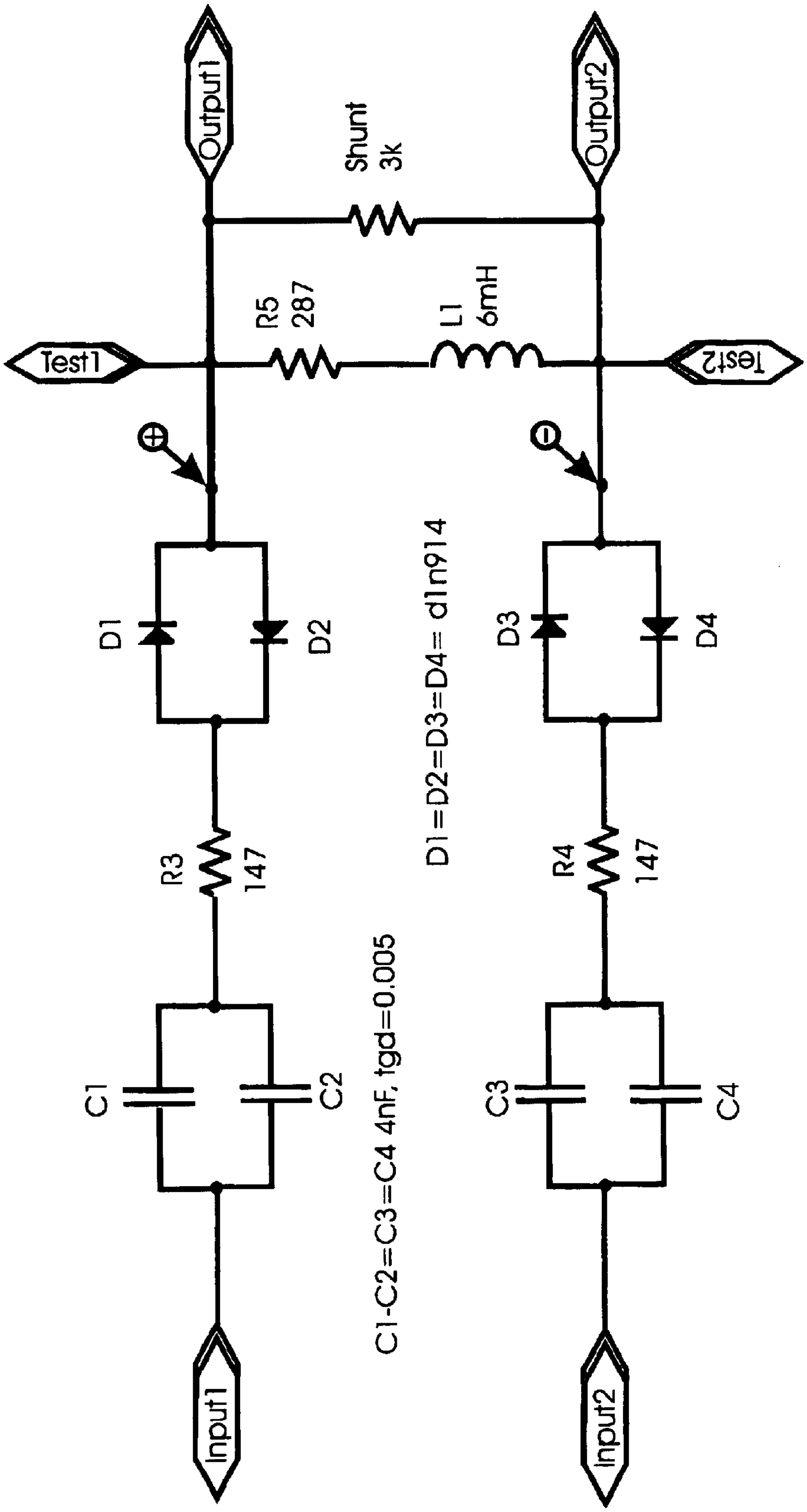
FIG. 9 shows a Spice model for the non-linear circuit shown in FIG. 8.

The Spice model of the non-linear circuit is presented in FIG. 9. It is exactly the part between driver TC4427 and resistors R6, R7 of the circuit in FIG. 8. The branch "Shunt" emulates total impedance of resistors R6, R7 and input impedance of circuit "To Signal Conditioning" which is unknown. For a particular reason, which will be explained below, the shunt is supposed to be equal to 3 k.

Figure 10:
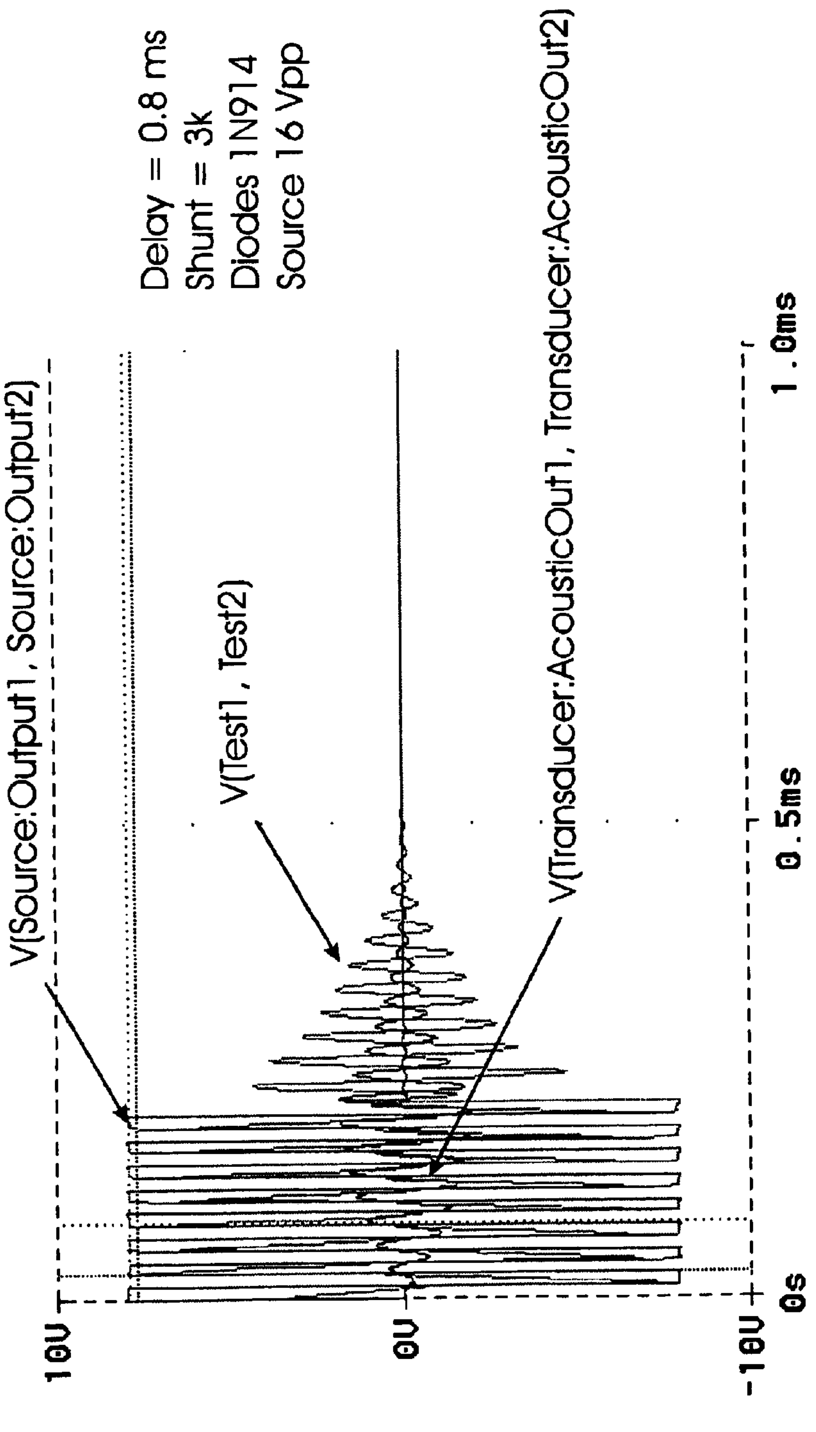
FIG. 10 shows a graph of signals observed under transient analysis of the non-linear circuit shown in FIG. 8.

In FIG. 10, signals observed under transient analysis are presented. The "SourceTC" output is established to be 8 cycles, i.e. of 0.2 ms duration. The "conditional" acoustic output of the transducer displays only the output burst shape but not its level. The remaining curve shows the electrical signal at test points. Just this signal is one of interest. Its "tail" forms a ring floor that interferes with received signals and increases a dead zone. The "received" signal is not shown in FIG. 10 because of the low sensitivity of the simulation display (used scale from −10V to 10V). Notes in the low right corner of the display show conditions under which the analysis has been done. "Delay" is the delay line parameter that allows simulation of different distances to a target and the analysis of the interference of the ringing and the received signals. That was being done at the scale of −10 mV, 10 mV, that is, at the level of about −60 dB related to the electrical input. Such diagrams are presented in FIGS. 11 and 12. Here the interfere signal (ringing), the received signal and a conditional radiated acoustic burst signal are shown. The latter signal is rendered only for information. Any estimation using it is impossible because it only emulates acoustic burst that is not present at electrical side of the transducer.

Figure 11:
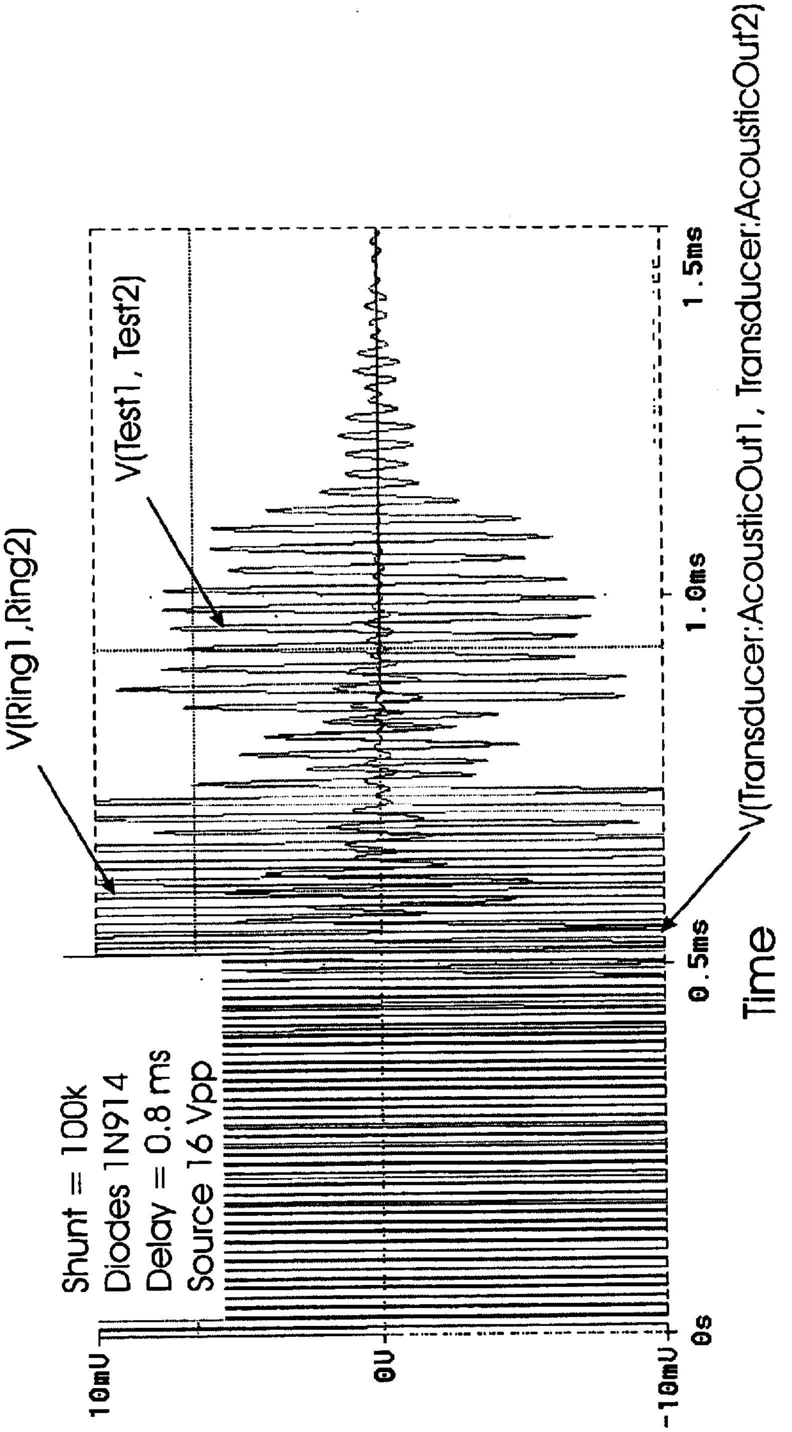
FIG. 11 shows a simulation display with signal diodes in the non-linear circuit shown in FIG. 8.
Figure 12:
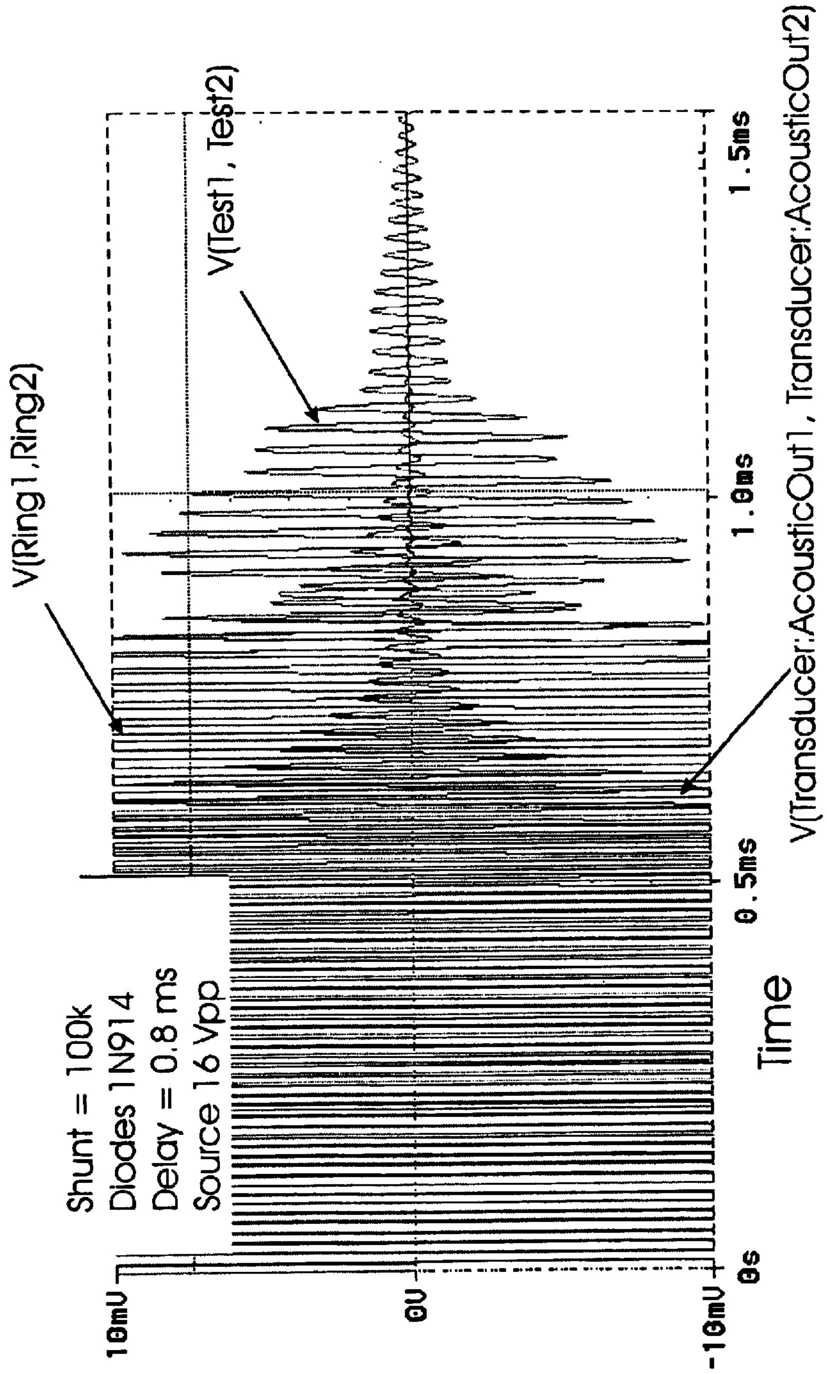
FIG. 12 shows a simulation display with rectifier diodes in the non-linear circuit shown in FIG. 8.

Displays rendered in FIGS. 11 and 12 show the difference observed when different diodes are used in the circuit. When signal diodes (1N914) with relatively small forward current (100 mA) and small recovery time (4 ns) are used, the signal shape is less "pure" than in case of rectifier diodes (1N4002) but ringing is shorter.

Figure 13:
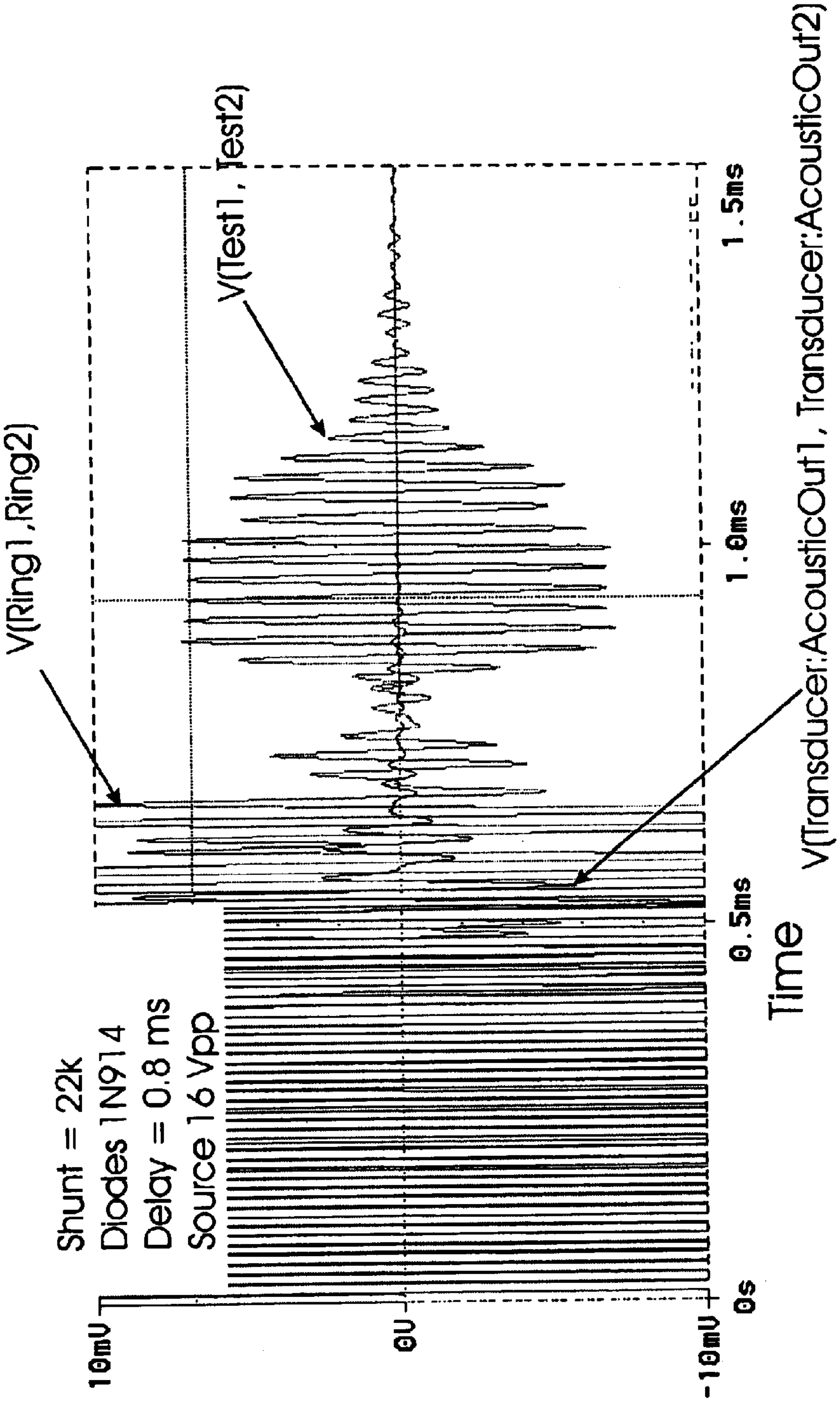
FIG. 13 shows the signals received when the shunt on the non-linear circuit shown in FIG. 8 is 22 k.
Figure 14:
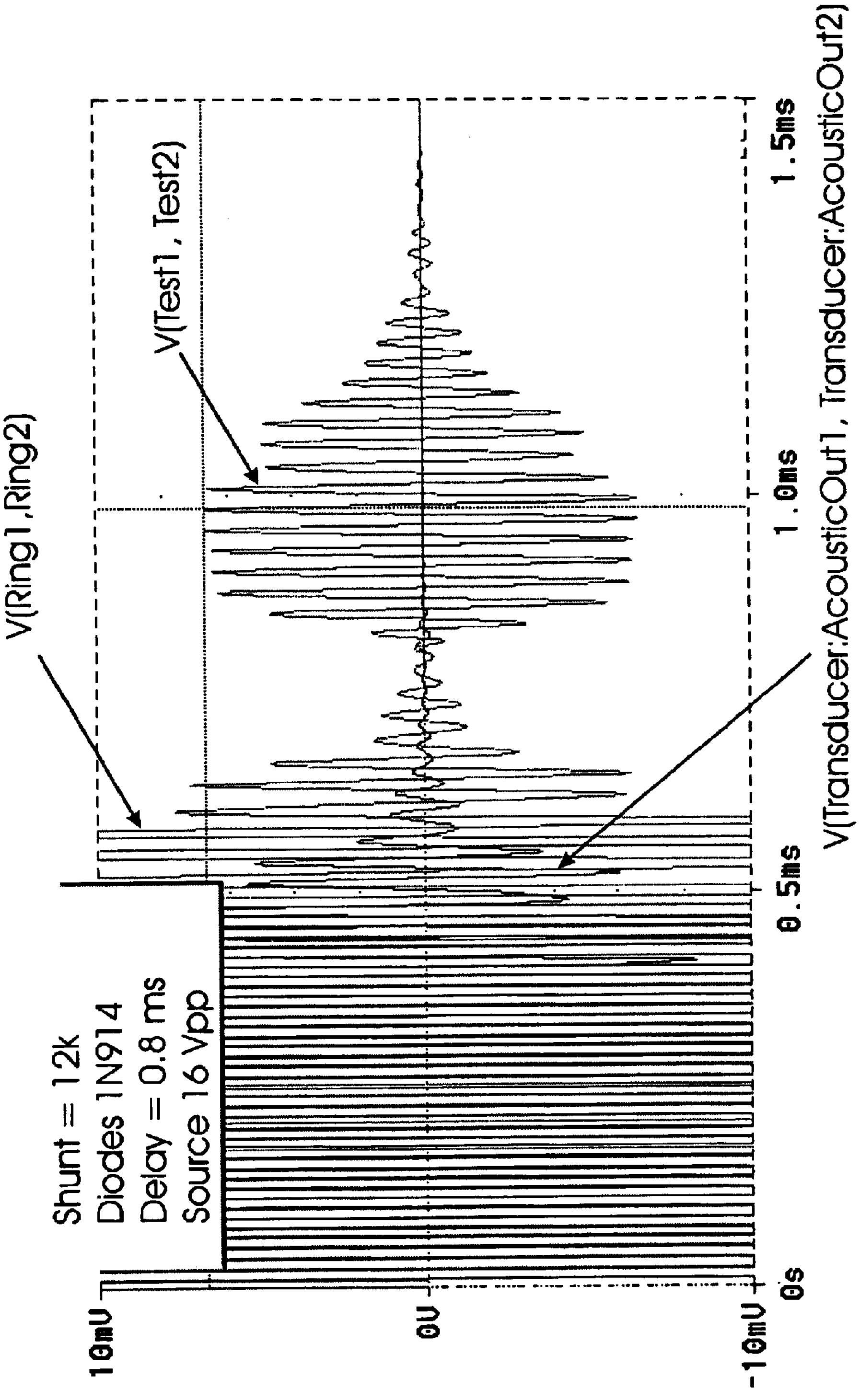
FIG. 14 shows the signals received when the shunt on the non-linear circuit shown in FIG. 8 is 12 k.

The first step in the analysis was to investigate the influence of the "To Signal Conditioning" circuit input resistance that was emulated with "Shunt". Results when it is of about 100 k are presented. One can see the distortion of the received signals. Under certain conditions, the received signal can only be treated as several signals (FIG. 11). From FIGS. 13, 14 and 15, one can see what happens to signals when the resistance of the shunt decreases. Three main effects are observed: the signal shape becomes more pure, the ringing decreases, and the signal level also decreases. If the main criterion is to reduce the ringing duration, the best result is observed when the shunt resistance is about 3 k. In this case, the signal level does not decrease significantly and thus the shunt resistance of 3 k was chosen in all further simulations. This corresponds to input resistance of "To Signal conditioning" circuit of about 1 k.

Figure 15:
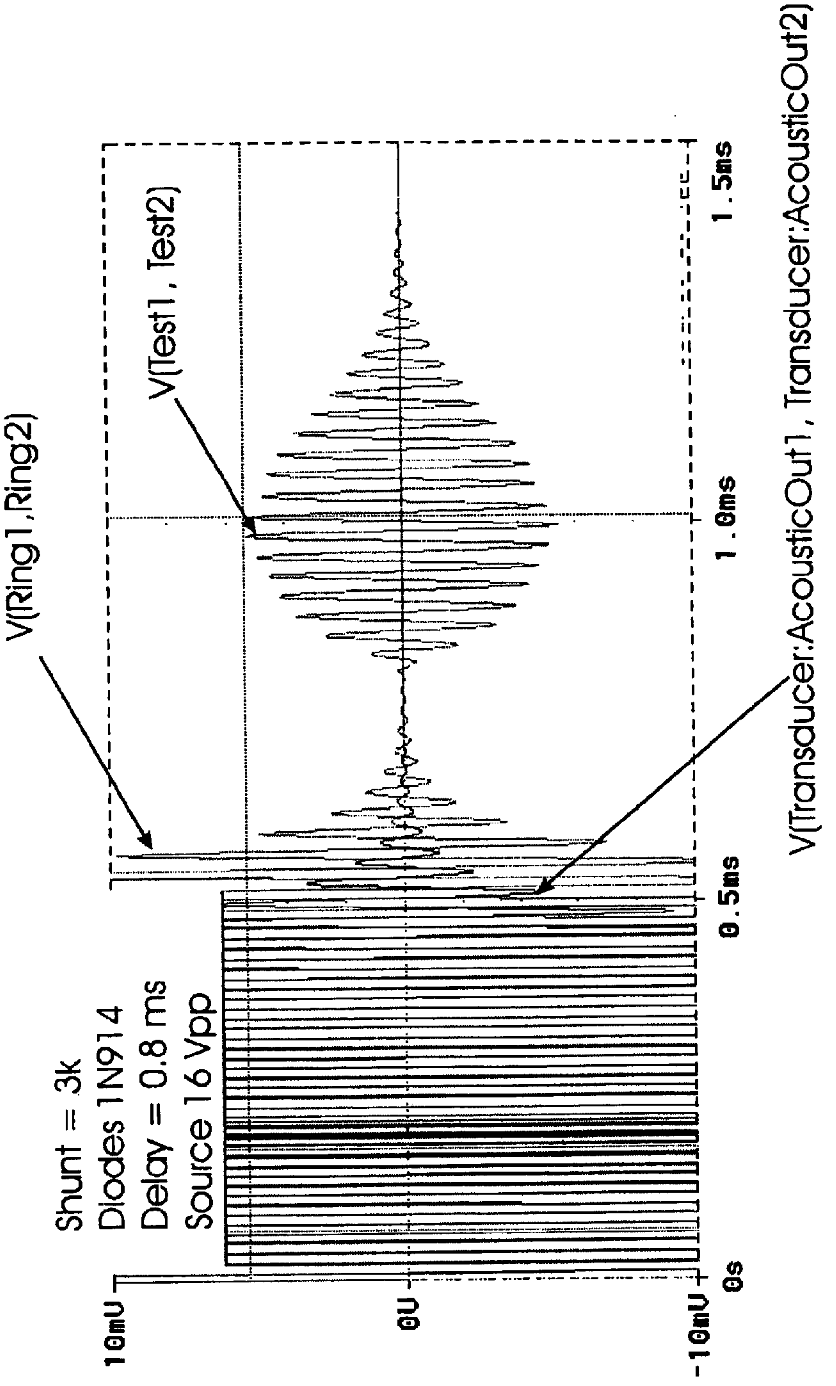
FIGS. 15, 16, 17 and 18 show the signals received when the shunt on the non-linear circuit shown in FIG. 8 is 3 k and with a variable delay.
Figure 16:
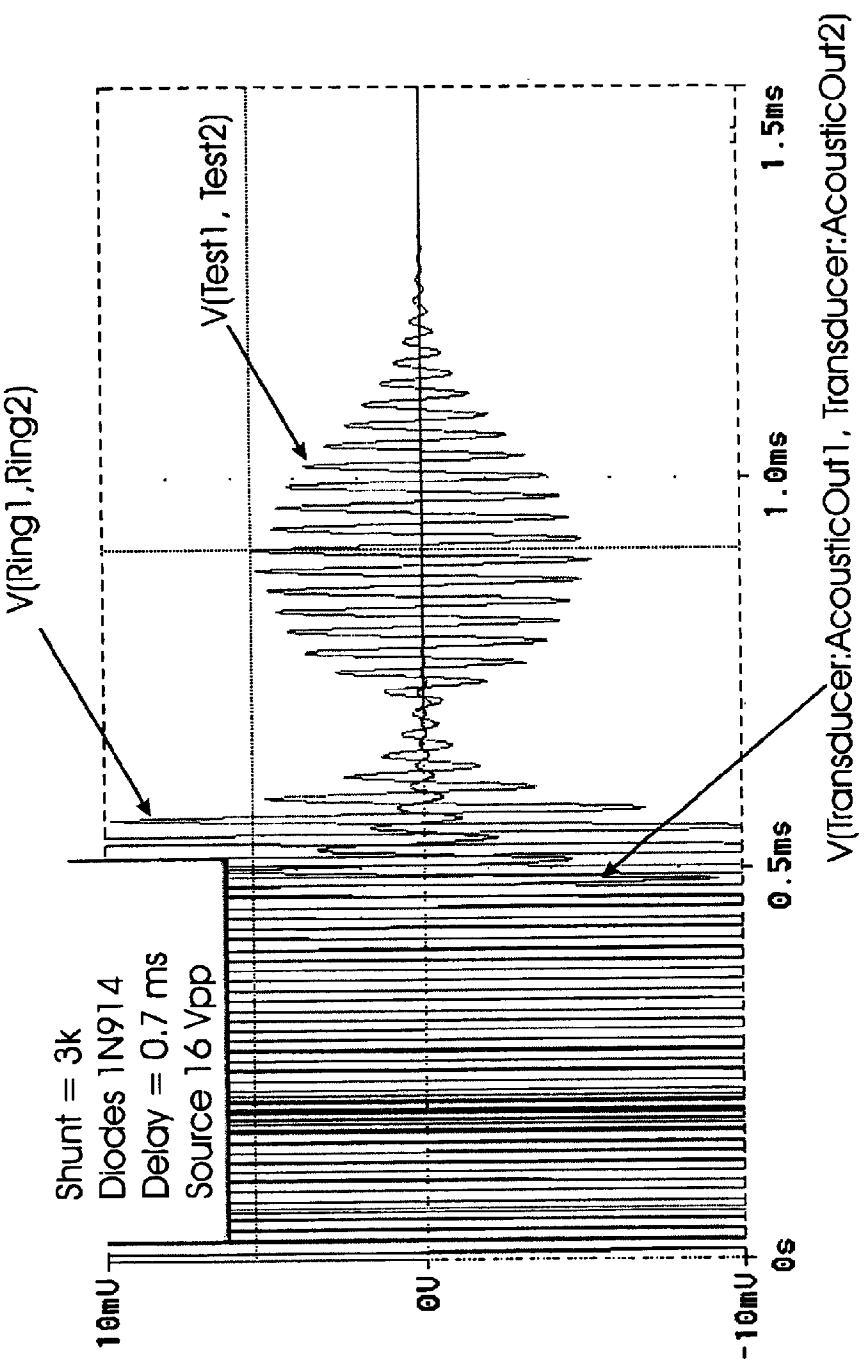

FIG. 16 shows the shape of the signal received for the same conditions as in FIG. 15 except that the delay in the medium is 0.7 ms. Similarly, FIG. 17 shows the shape of the signal received for the same conditions as in FIG. 15 except that the delay in the medium is 0.6 ms and FIG. 18 shows the shape of the signal received for the same conditions as in FIG. 15 except that the delay in the medium is 0.5 ms.

Figure 17:
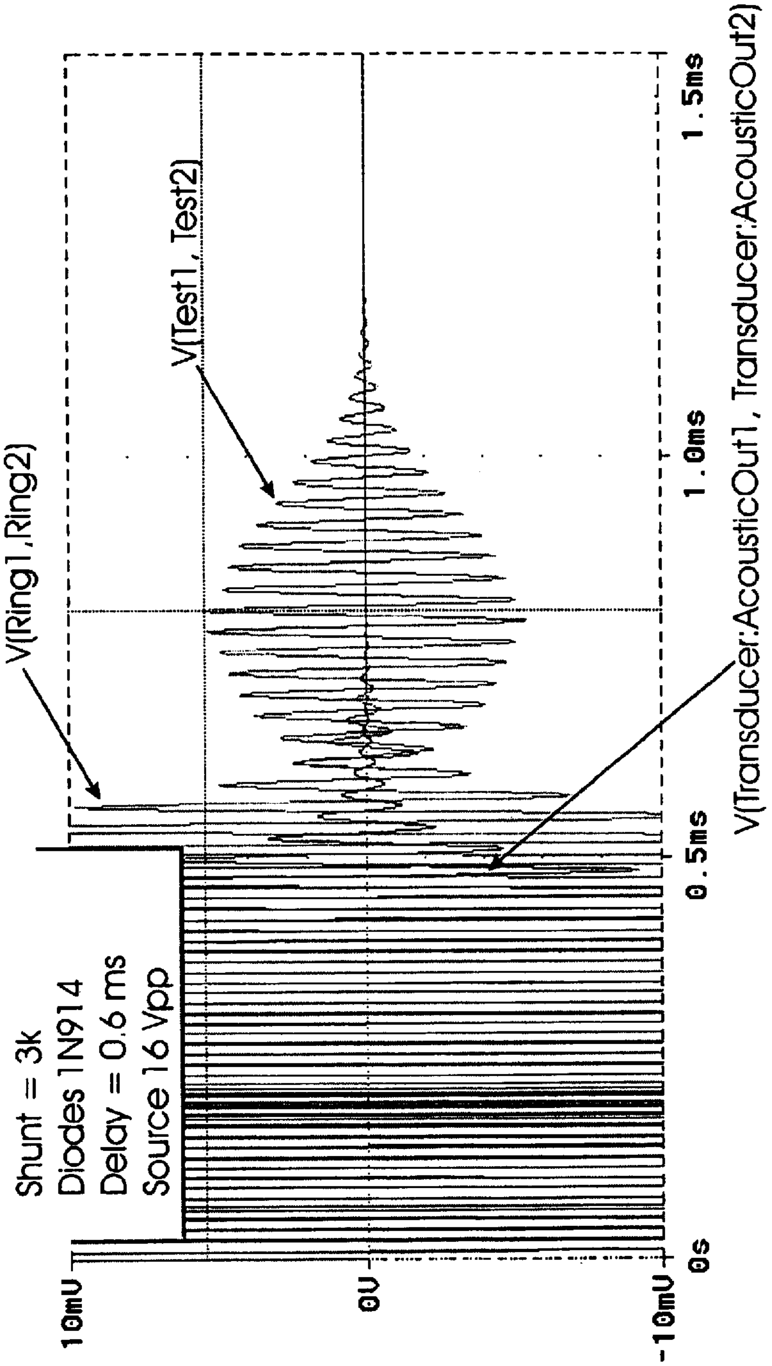
Figure 18:
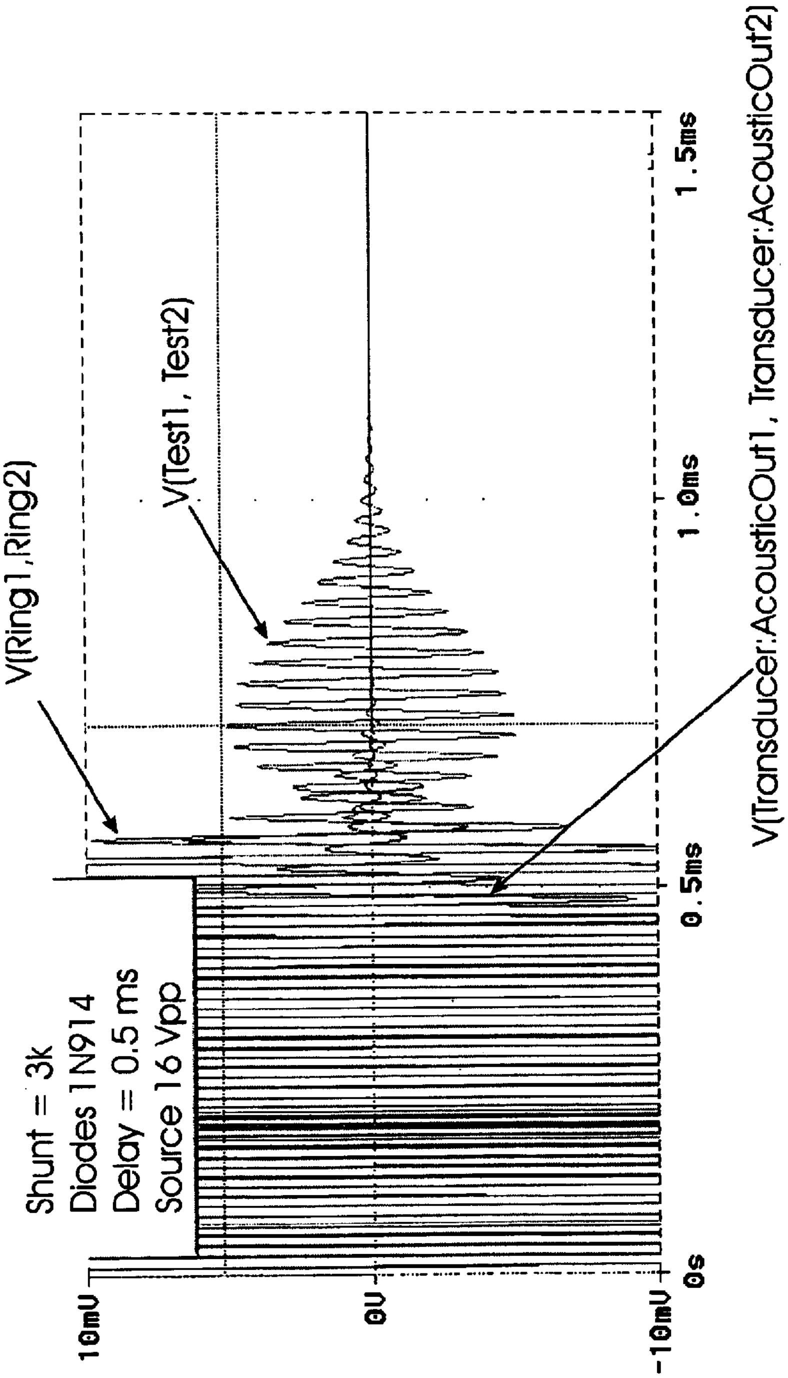

In this case, the signal shape and ringing duration are so good that delay time in simulation can be decreased to 0.6 ms when the received signal maximum is observed at 0.8 ms (see Probe Cursor in FIG. 17). The received signal can be even easily detected at 0.7 ms when the delay time is established 0.5 ms (Probe Cursor, FIG. 18). Thus, the circuit under consideration provides satisfactory results.

An analysis of the manner in which the circuit parameter variations affect its characteristics is as follows. First, the ringing duration will be considered.

To compare different versions, we will define ringing duration as a time at which the ringing floor is approximately 10 times less than a maximum level of the signal received. In FIGS. 19–24, the ringing floor is represented by cursor A2 and the maximum level of the signal received is represented by A1.

Figure 19:
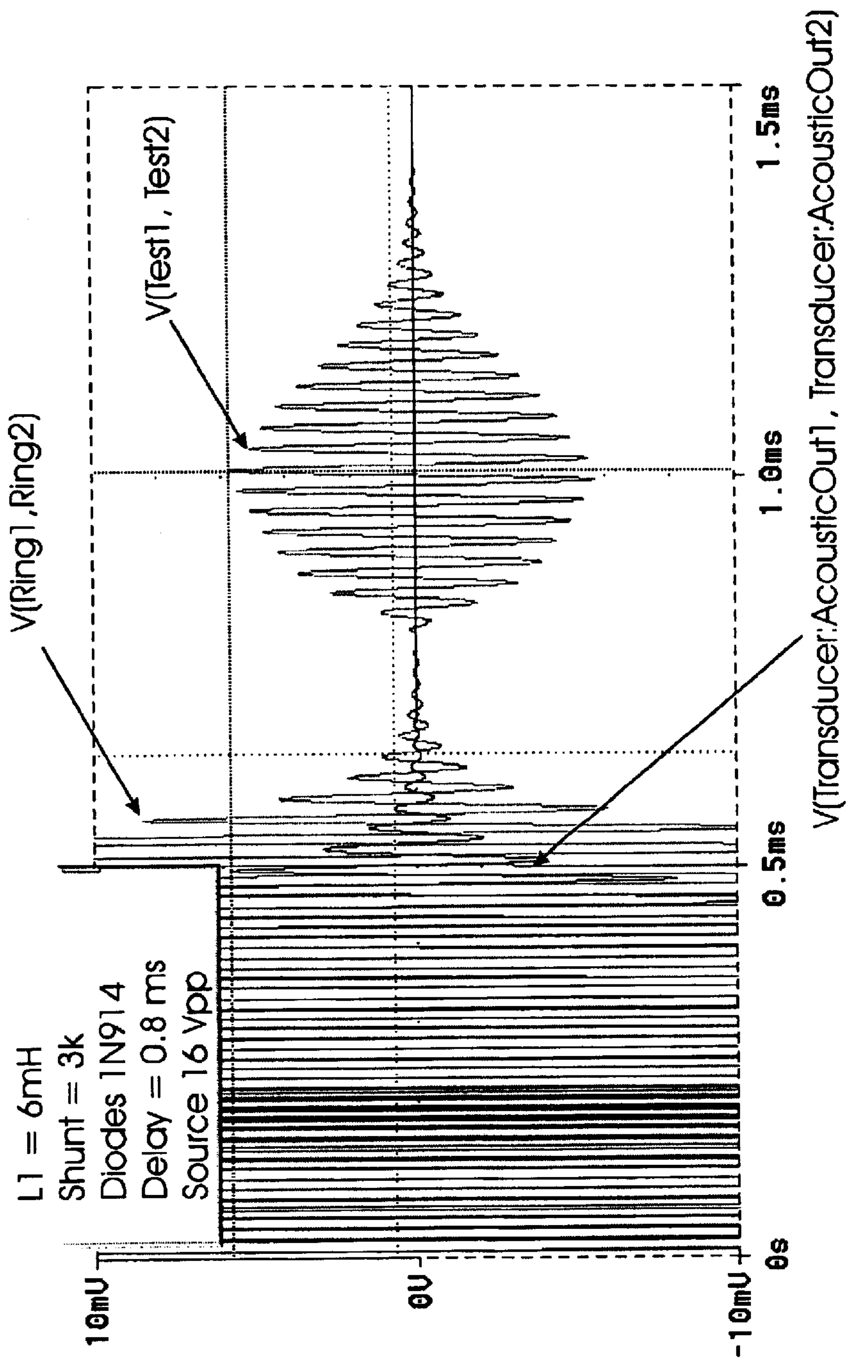
FIGS. 19, 20, 21, 22, 23 and 24 shows the signals received for the non-linear circuit shown in FIG. 8 for various circuit parameters.
Figure 20:
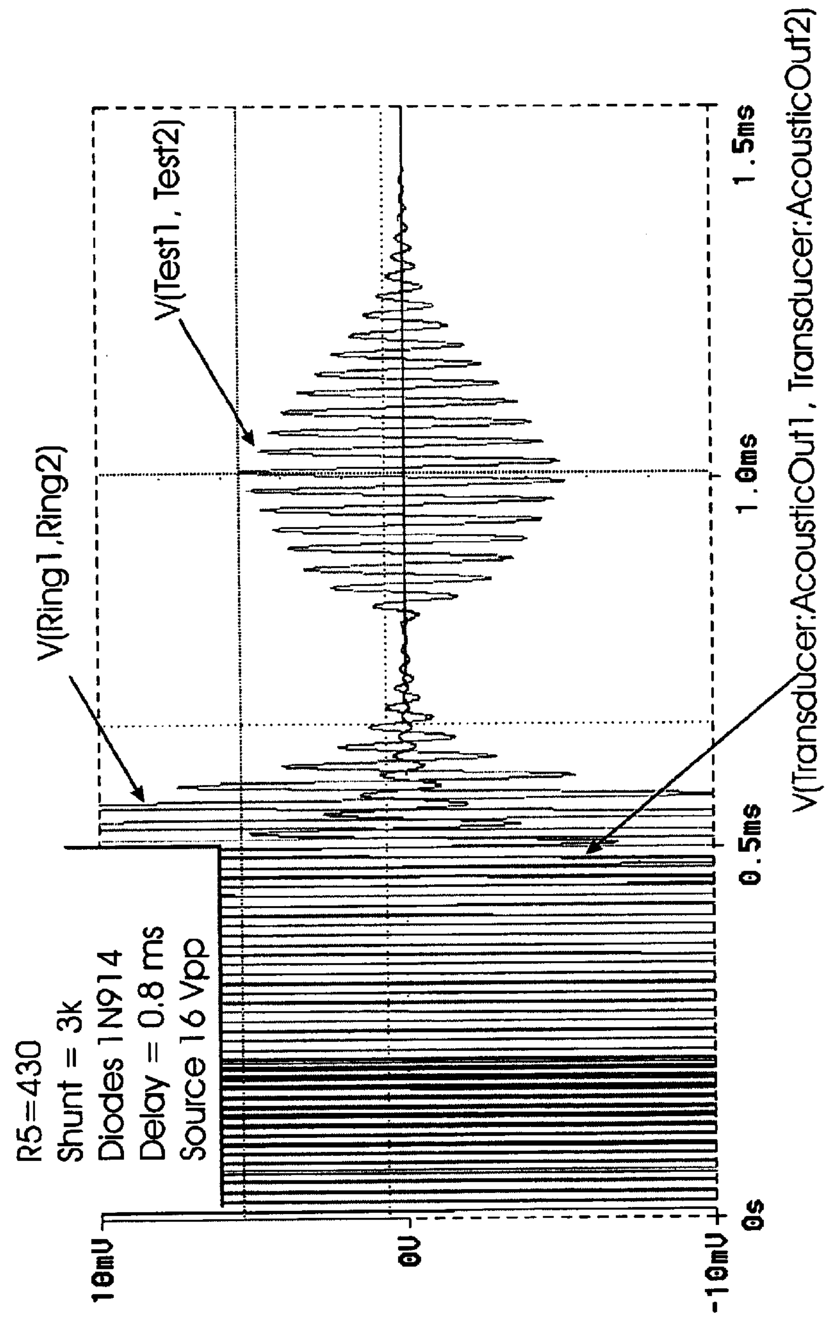
Figure 21:
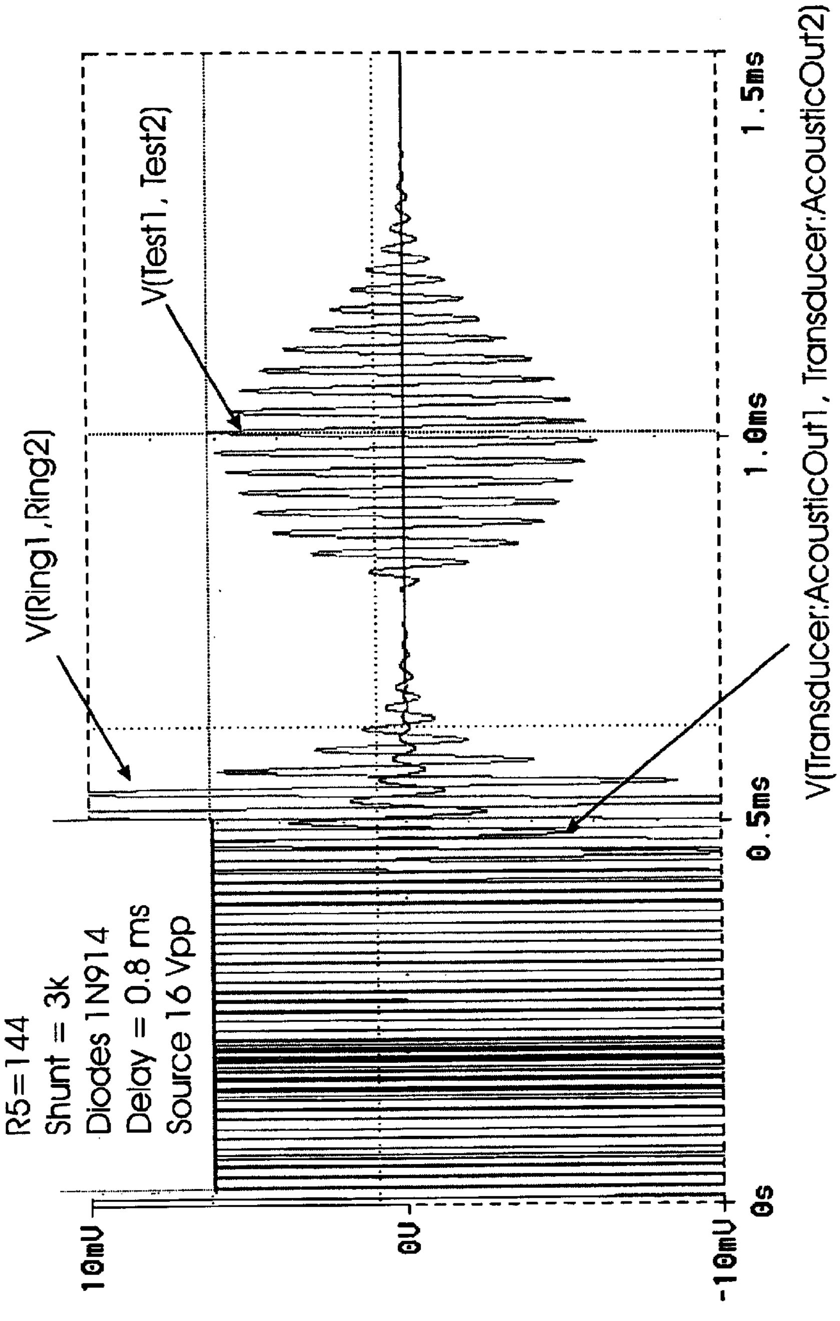
Figure 22:
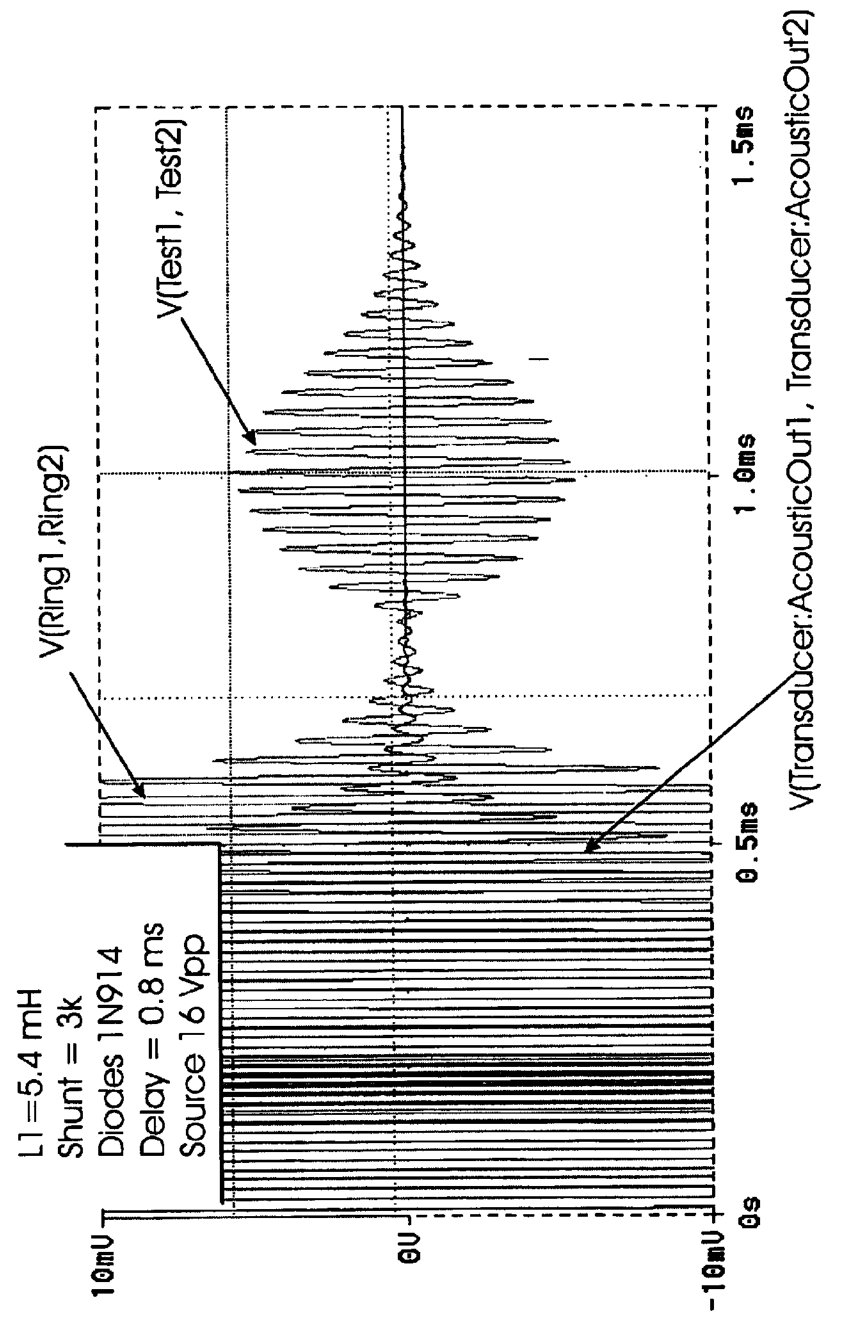
Figure 23:
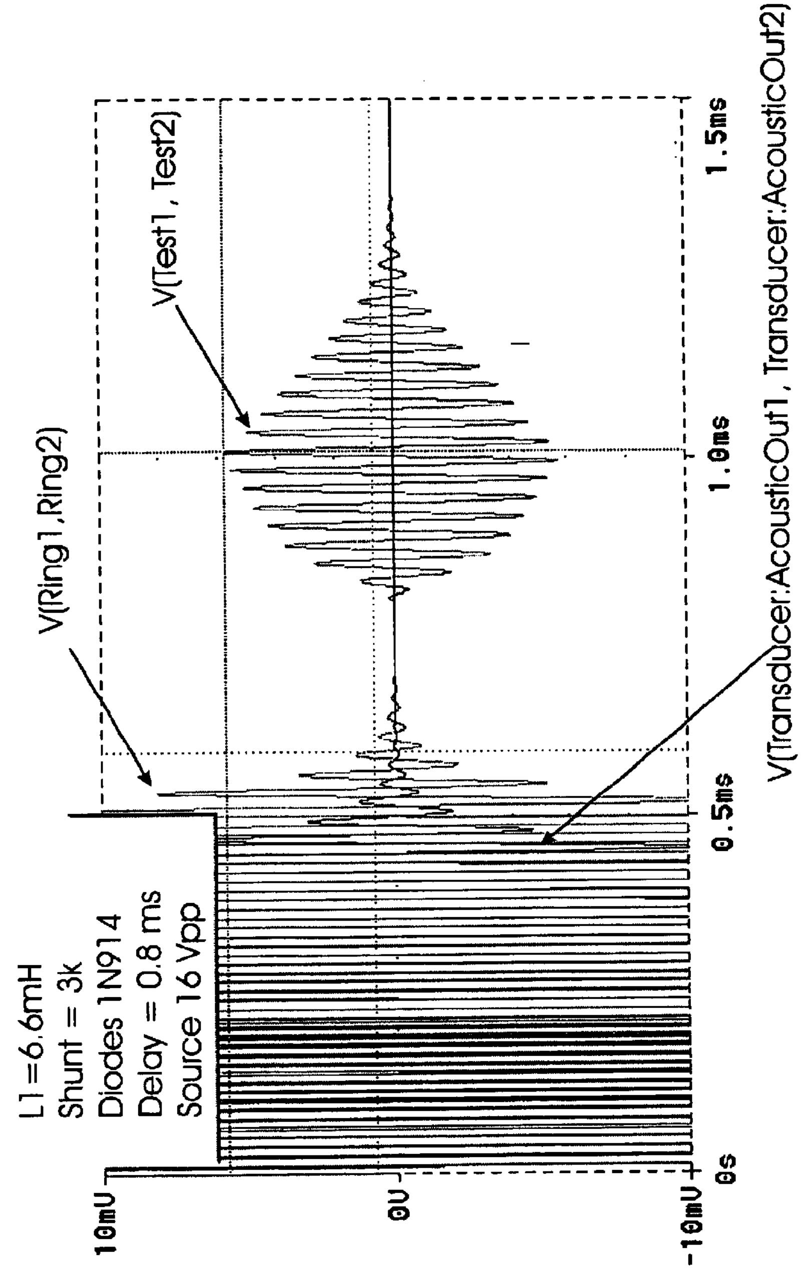
Figure 24:
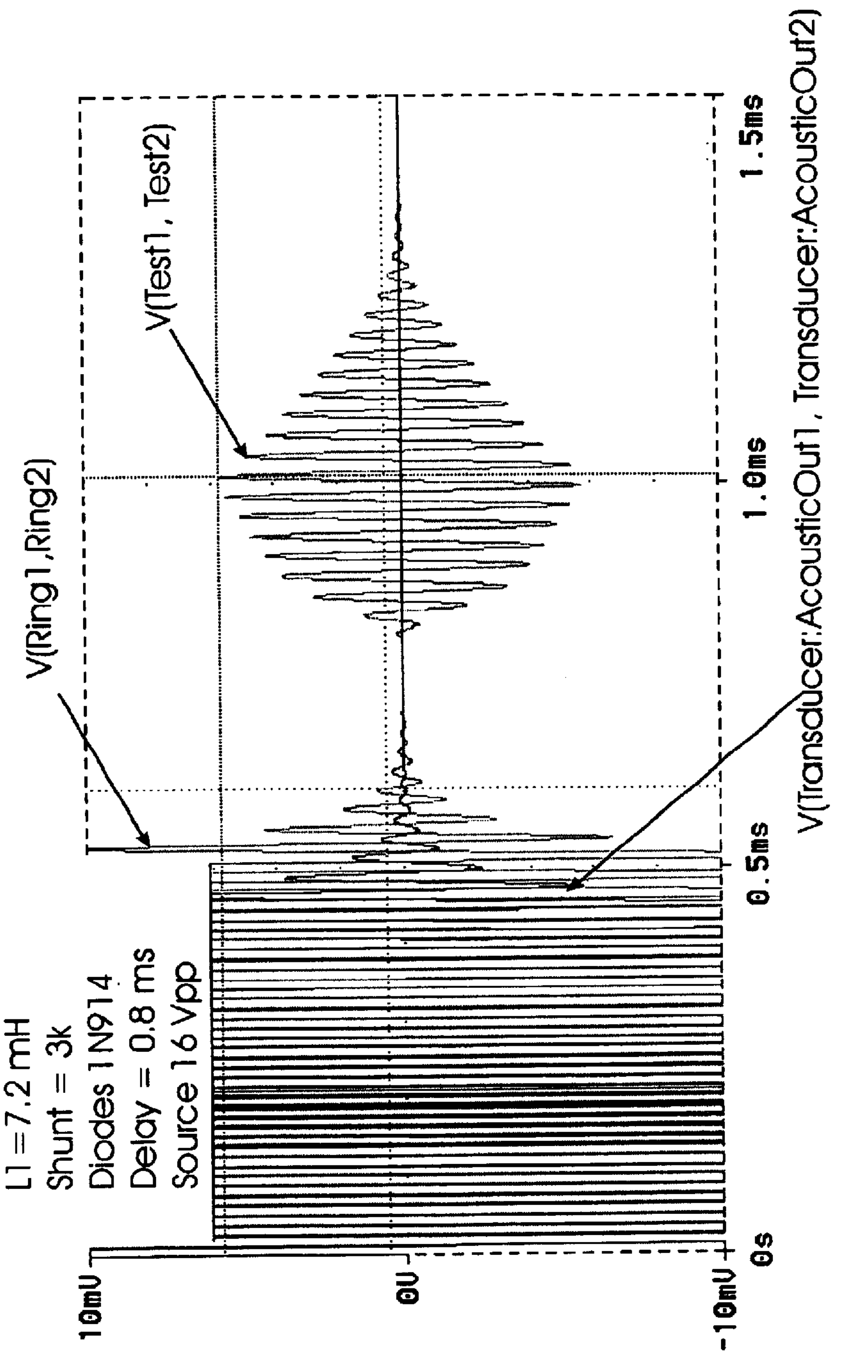

The main electrical element used to suppress ringing in the circuit under consideration is inductance L1=6 mH. So, variations of its branch will mainly be analyzed. FIG. 19 displays the result when the circuit has original parameters. (Note there is some difference with FIG. 15 in which the circuit has identical parameters. It is due to more exact analysis performed here: the time step in the transient analysis was decreased from 1 $\mu$s to 0.2 $\mu$s). FIGS. 20 and 21 shows the effect of changing R5 by 50%. An increase of R5 is equivalent to the quality factor decrease of the inductance branch, and vice versa. One can see that the greater quality factor, the less the ringing duration is (FIG. 21), but generally, its influence is not significant (tens microseconds). It is another matter when inductance itself is changed (FIGS. 22–24). Variations of 10% inductance related to its original value of 6 mH result in changes of ringing duration by hundreds of microseconds. The remarkable fact is that the best result occurs when inductance is equal to 6.6 mH, i.e., it is just tuned with the transducer capacitance $C_0$ at the transducer dynamical resonance frequency $f_5$ equal to 38.8 kHz for model simulated. Further increase of the inductance up to 7.2 mH (by another 10%) deteriorates the result (FIG. 24).

From the simulation and analysis performed one can conclude the following:

- the original non-linear circuit provides necessary ringing suppression of the Murata transducers MA40S4R/S and pure received signals if the inductance branch (the transducer input) is shunted with resistance of several kOhm. The ringing suppression is of such value that received signals could be easily detected at time of 0.7 ms. The payment for that is reduction of the signal received;
- without the shunt, significant distortions of the received signal are observed which can be treated as additional reflections from a target; and
- the original circuit characteristics could be improved with more exact tuning of the inductance value L1 but expected improvement is not significant. Thus, the circuit parameters are close to optimal.

A linear circuit optimized on the basis of Fano's theory will now be discussed.

The method developed for broadband matching of piezoelectric transducers in Yurchenko A.V., Broadband matching of piezo-transducers of acousto-optic devices, Izvestiya VUZ., Radioelektronika, vol 23, No. 3, pp. 98–101, (1980), was used to build a circuit for ringing suppression. Preliminary simulation and experiment showed that the simplest matching circuit (FIG. 25) with optimal by Fano Chebyshev transfer function.

$$tr\_f = 20\log(U_{out}/E)$$

of the second order could provide a necessary bandwidth if the inductance value were of about 2 mH. The circuit was synthesized to get parallel inductance of 2.2 mH because the industry produces such inductors of small sizes and rather high quality factor (Q>30). Then the circuit obtained was modified to get a smooth phase transfer function due to fitting the resistive impedance of the generator $R_g$. That results in a reduced ringing duration at the "conditional acoustic output", resistance $R_0$. Hence, ringing at the transducer input should be also reduced.

Figure 25:
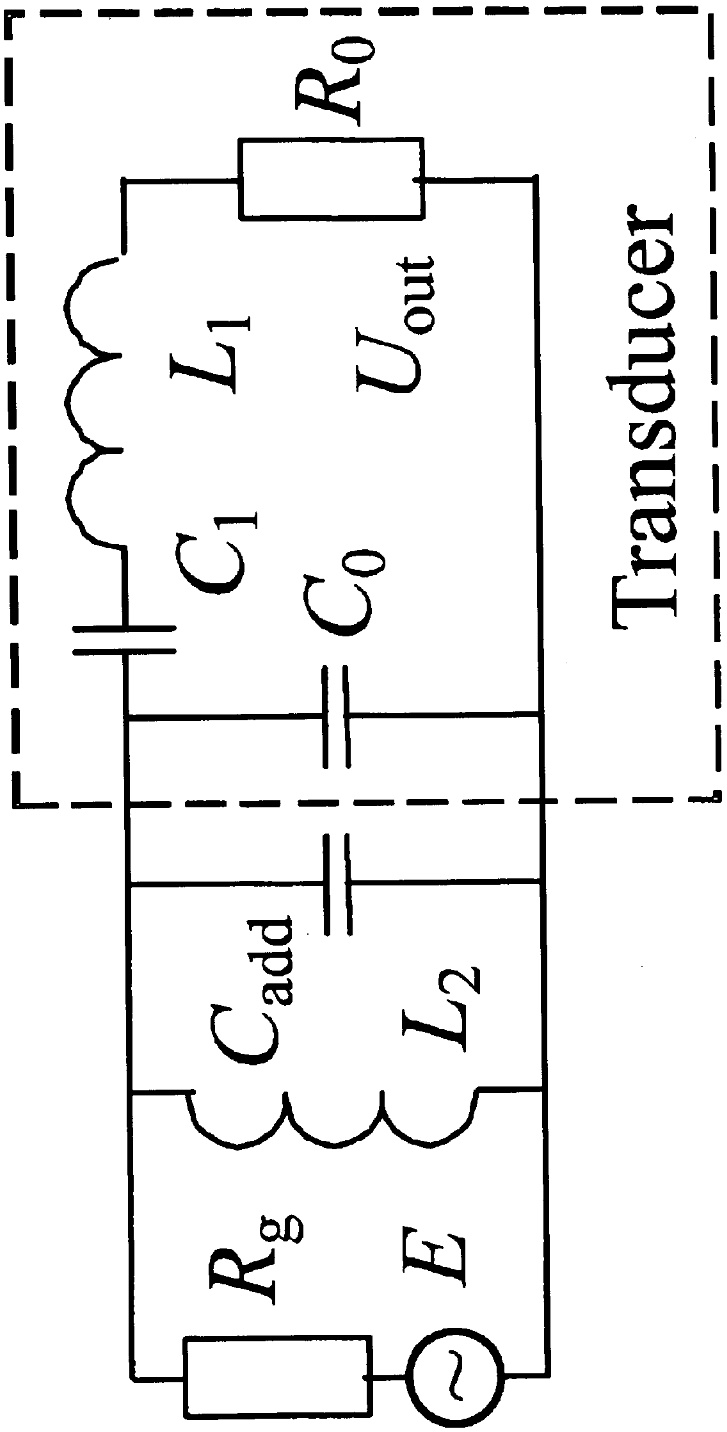
FIG. 25 shows an equivalent circuit of the transducer with a matching circuit.
Figure 26A:
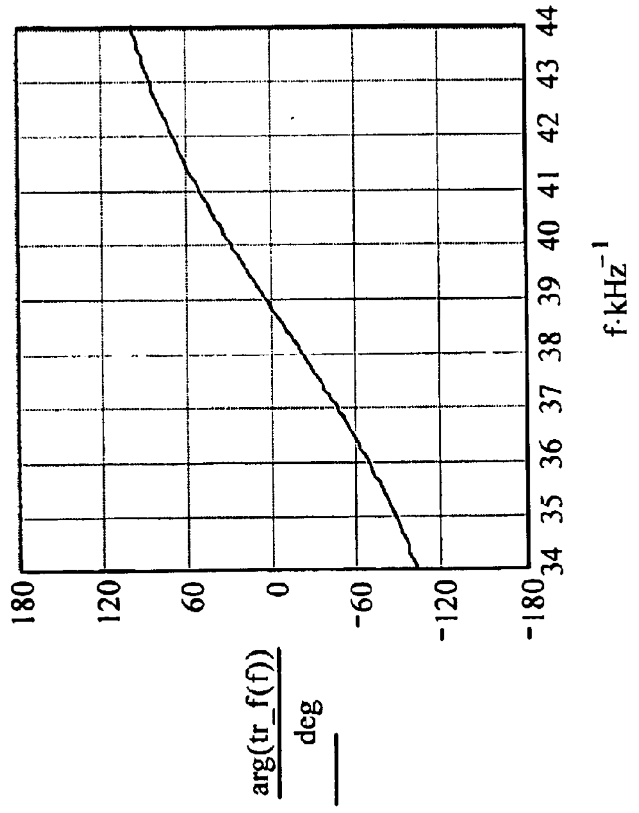
FIGS. 26*a*, 26*b*, 26*c* and 26*d* show calculated transfer and transient functions of the linear circuit.
Figure 26B:
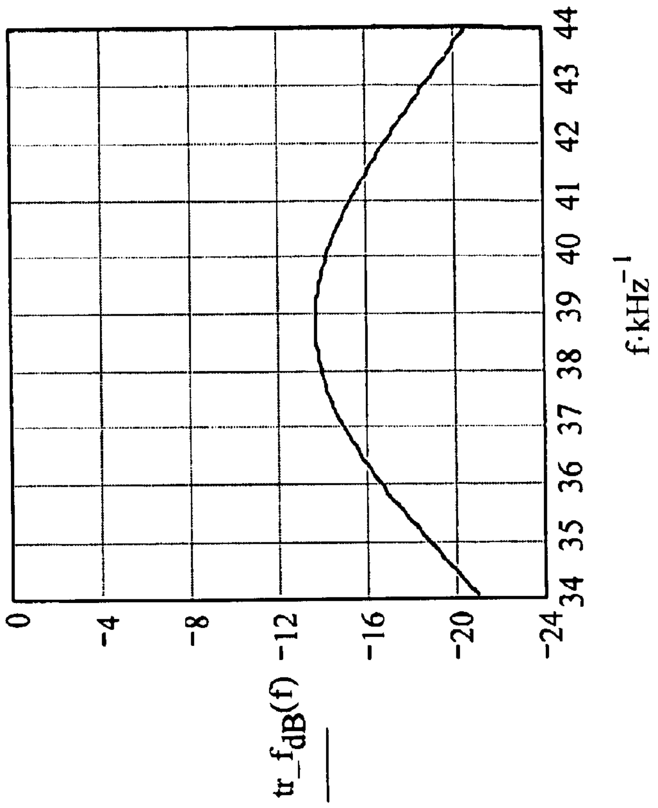
Figure 26D:
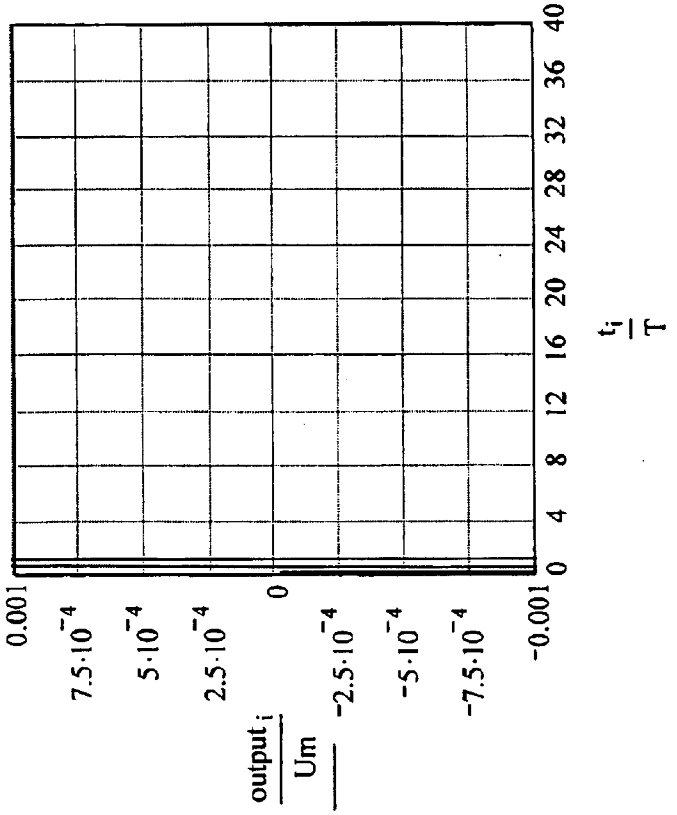
Figure 26C:
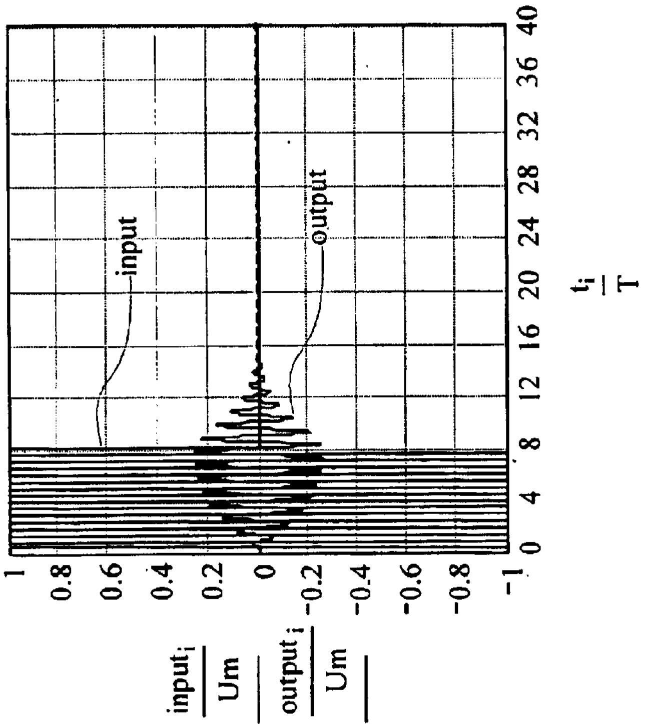

FIG. 25 shows an equivalent circuit of the transducer with a matching circuit.

With respect to FIGS. 26*a*, 26*b*, 26*c* and 26*d*, the following data is relevant:

Circuit:
- $\delta$=0.131
- $R_g$=1400Ω
- $L_2$=2.203 mH
- $C_2$=7.645 nF
- $C_0$=2.553 nF
- $C_{add}$=5.092 nF
- $\Delta f_{Fano}$=7.51 kHz
- $L_1$=58.586 mH
- $C_1$=287 pF
- $R_0$=362Ω
- Q=39.428

Signal:
- $f_s$=38.78 kHz
- $f_0$=38.78 kHz
- n=8

Data:
- ReNmb =21
- ImNmb =22
- Averaged data Numbers 21 @22

Results:
- f:34 kHz,34.1 kHz . . . 44 kHz

A special Mathcad® 2000 code to synthesize circuits with given ringing duration was developed and applied to the circuit design. Results of calculations are presented in FIGS. 26*a*, 26*b*, 26*c* and 26*d*. One can see that ringing in the total circuit is small (<0.5 ms) but losses are large (~13 dB) because of large resistance $R_g$. The large value of losses creates an impression that it is ineffective to apply the circuit. But this is not so. In actuality, due to the widening of the bandwidth, the input burst has time "to swing" the transducer, and the output reaches its maximum value. It is clearly seen in FIG. 26 (see output burst in the low left corner). Another point is that in the receiving mode the signal received is detected on the large resistance $R_g$, that is, the transducer sensitivity will not be reduced significantly. Thus, one can expect good results applying the circuit synthesized. This circuit, as well as the non-linear one analyzed above, has been simulated with the MicroSim® DesignLab software using the same total Pspice model but with another "Circuit".

Figure 27:
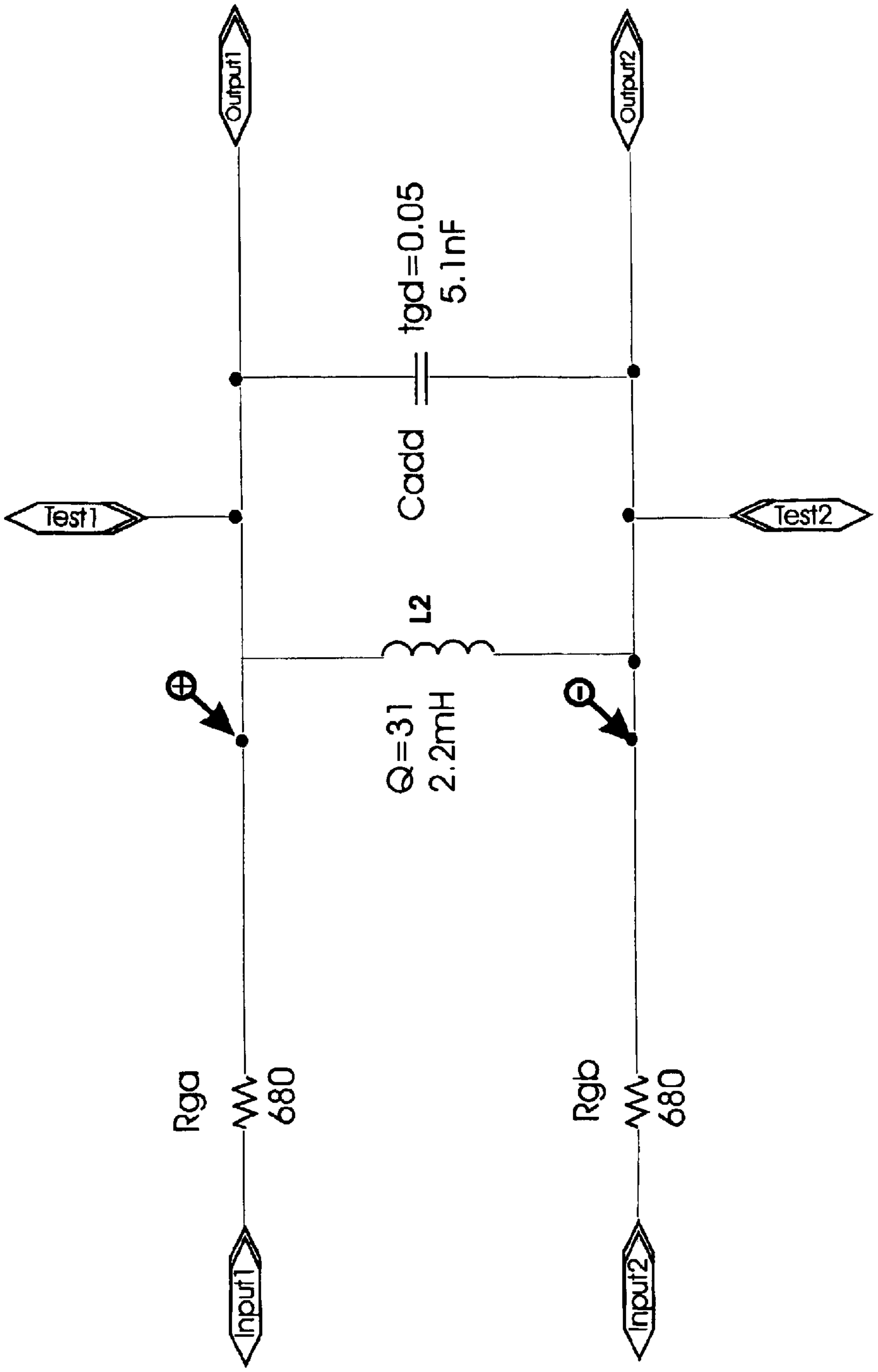
FIG. 27 shows a schematic of a linear circuit Spice model.

The linear "Circuit" Spice model used in simulation is shown in FIG. 27. It has the simplest structure of a pass-band filter. Resistors $R_{ga}$ and $R_{gb}$ emulate the necessary value of the source output resistance. Inductor L2=2.2 mH of the Coilcraft® type DS 1608-225 has the quality factor Q=31 given in the documentation. Losses of the capacitor $C_{add}$ have been taken arbitrarily. In simulation they are chosen large enough to have "a reserve" in practice.

Figure 28:
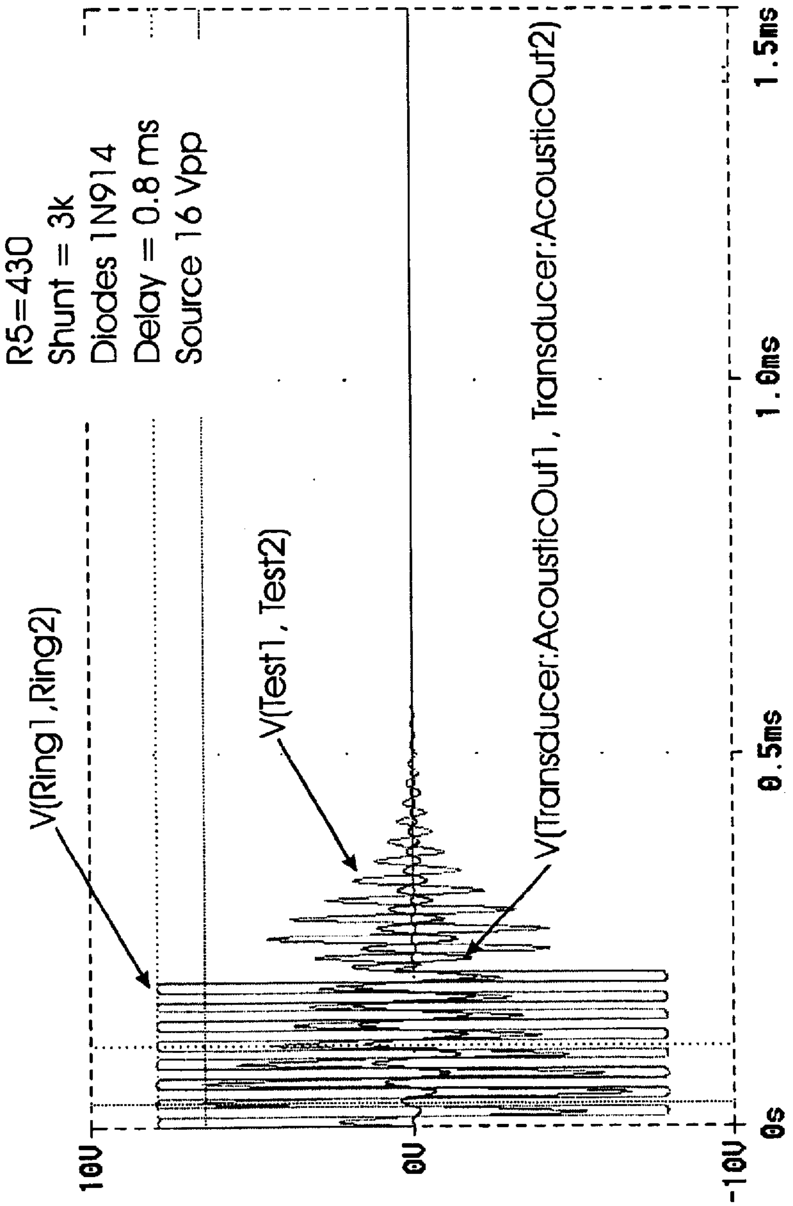
FIGS. 28, 29, 30, 31, 32 and 33 shows results of the simulation of the linear circuit Spice model shown in FIG. 27.
Figure 29:
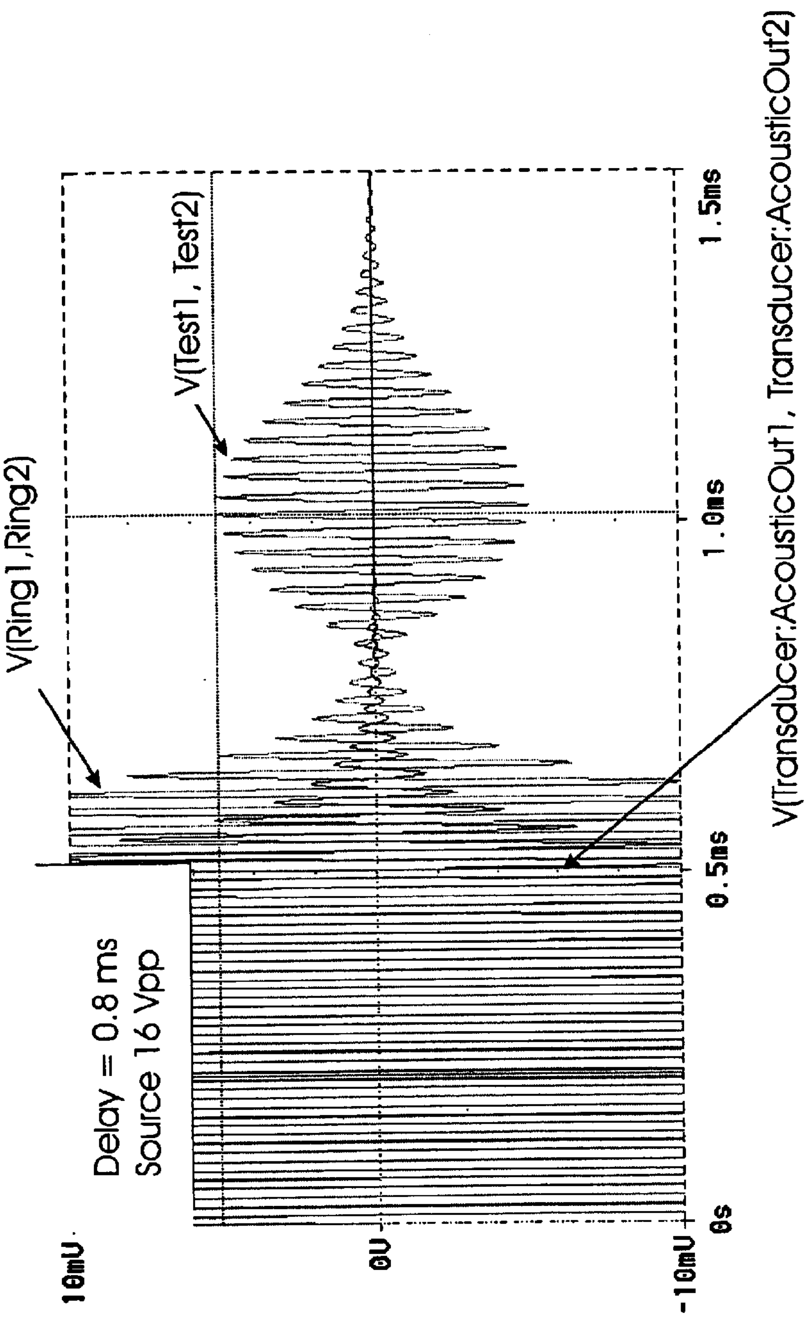
Figure 30:
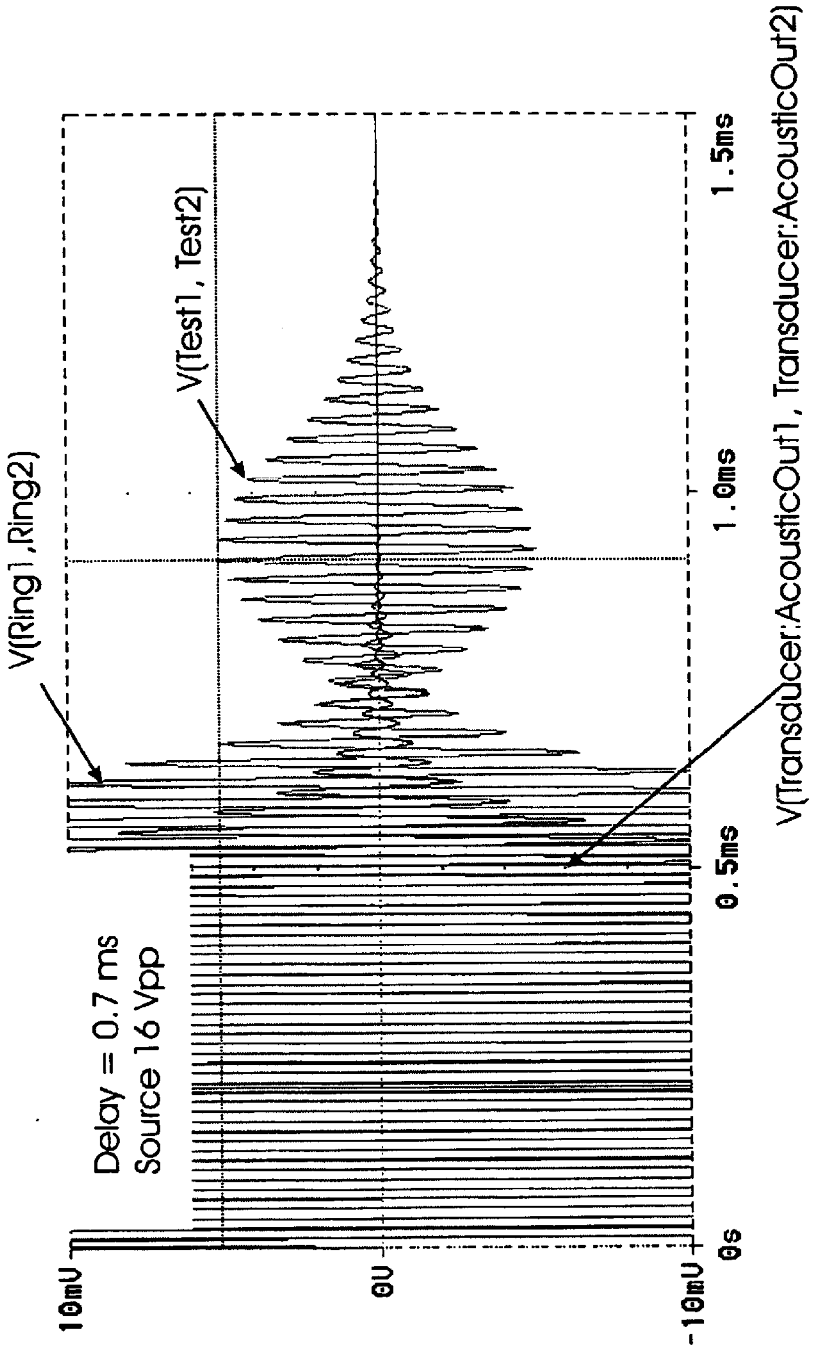
Figure 31:
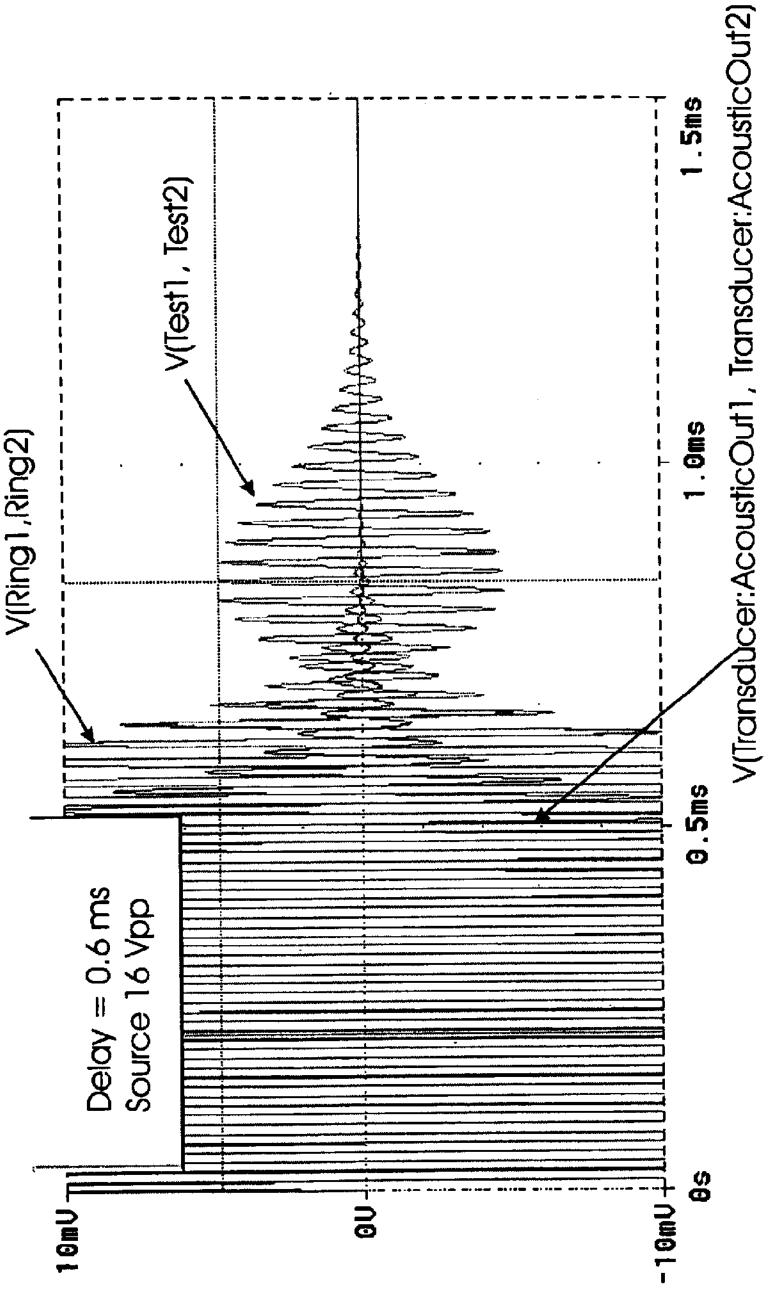
Figure 32:
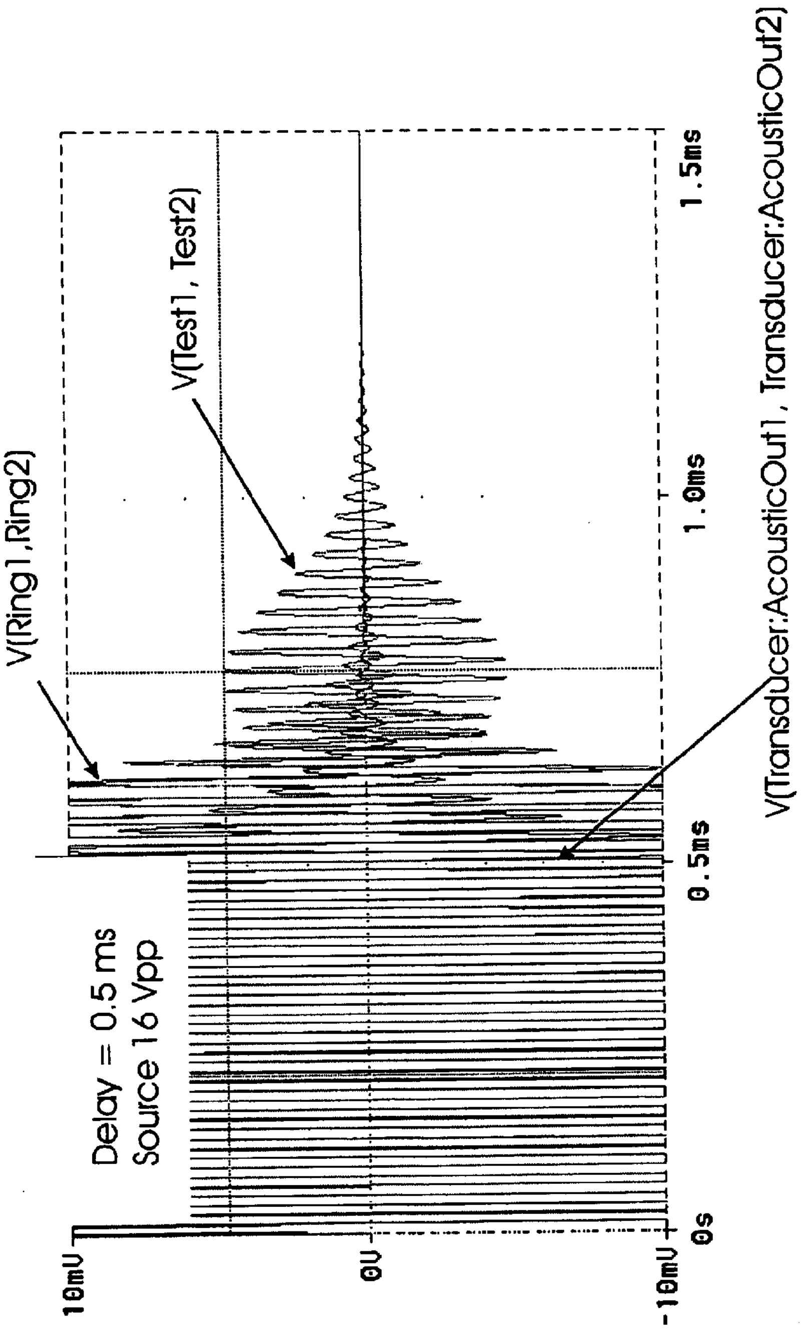

The simulation results are presented in FIGS. 28–33. FIG. 28 shows that the maximum voltage across test points (Test1, Test2), i.e., at electrical side of the transducer, is less than in case of the non-linear circuit (FIG. 10). It is caused by losses on the resistor $R_g$ and smoothing of the transient response of the total circuit. From FIGS. 29–32, it can be seen that the simulation results obtained with the circuit under consideration are similar to ones obtained with the non-linear circuit above but worse. Their improvement can be made in different ways. The classical one is to get the higher order transfer function. It requires another couple of an inductor-capacitor. Another way is to add some non-linear components.

Figure 33:
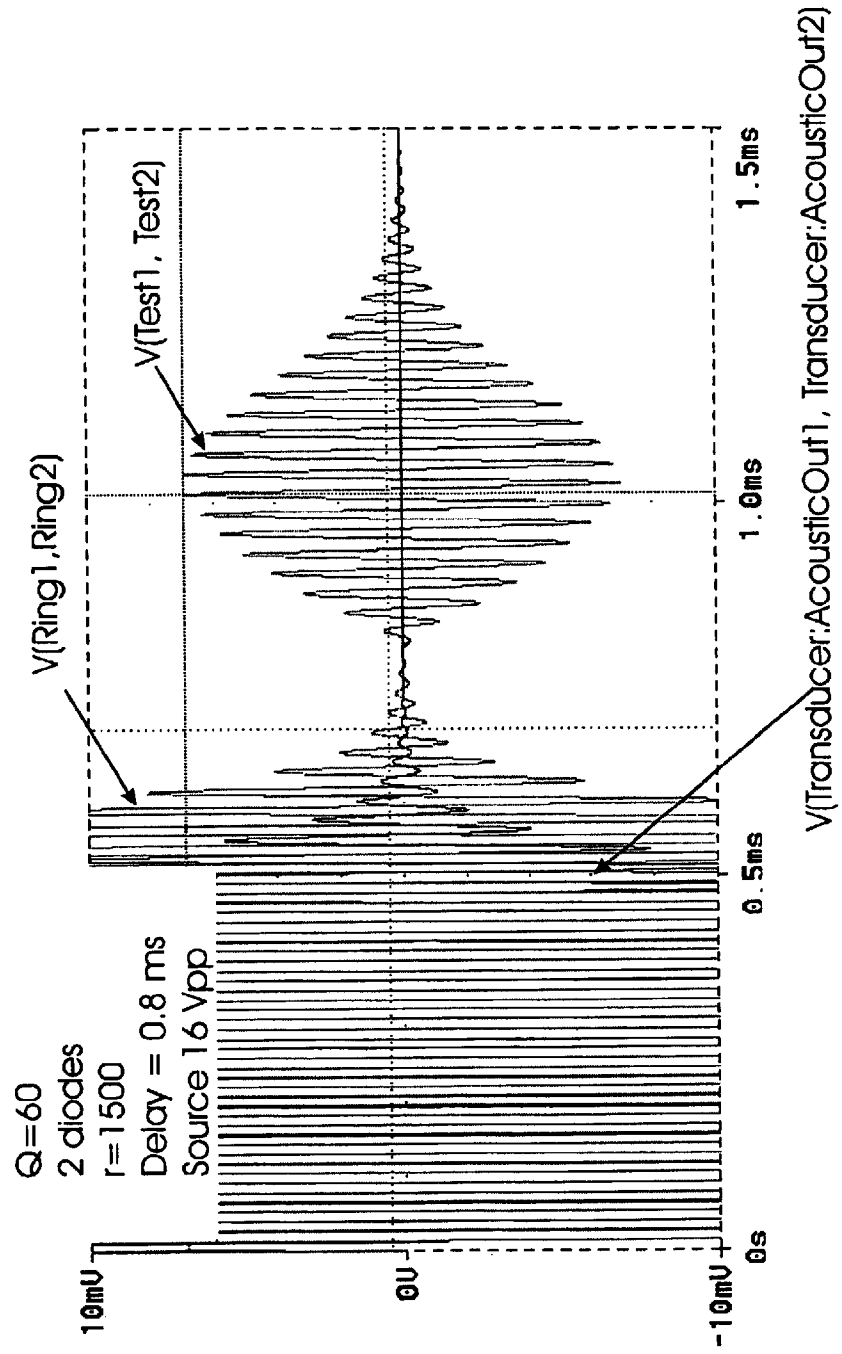

The result obtained in this way is presented in FIG. 33.

In addition, simulations with the Spice model provide results worse than one could expect from calculations made with Mathcad® 2000. In those calculations, "visible" ringing at "acoustic output" is less than 0.5 ms (t/T=20 in FIGS. 26*a*–26*d*). In the circuit Spice model, it is evidently longer (FIGS. 28–32). Apparently, it is connected with losses that were not taken into account in the mathematical model.

From the simulation and analysis performed one can conclude the following:

- the simplest second order linear circuit based on the Fano theory provides necessary ringing suppression of the Murata transducers MA40S4R/S and pure received signals but its characteristics are worse than those of the optimized non-linear circuit considered above. The ringing suppression is of such value that received signals could be easily detected at time of 0.9 ms;
- the circuit characteristics could be improved with added non-linear components; and
- to improve characteristics significantly, a more complicated circuit should be designed with higher order transfer function. It requires the addition of one or more capacitors and one or more inductors.

Experimental examination of the linear circuit is as follows.

Figure 34:
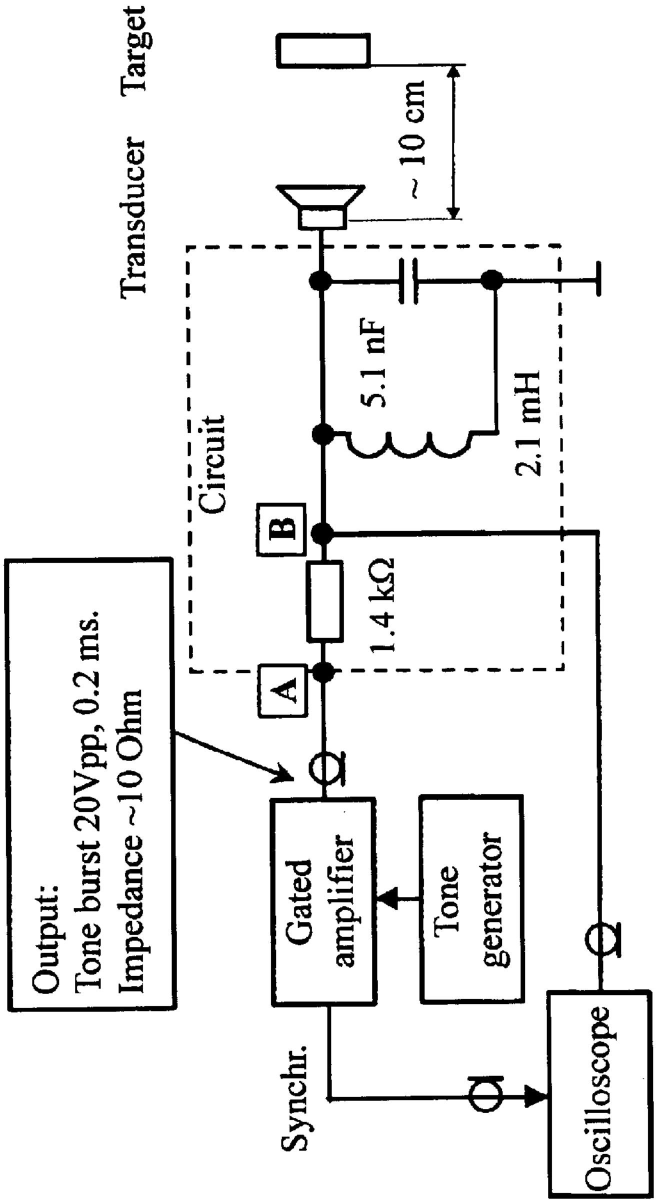
FIG. 34 shows a schematic of the measurement apparatus used to test the linear circuit shown in FIG. 27.
Figure 36:
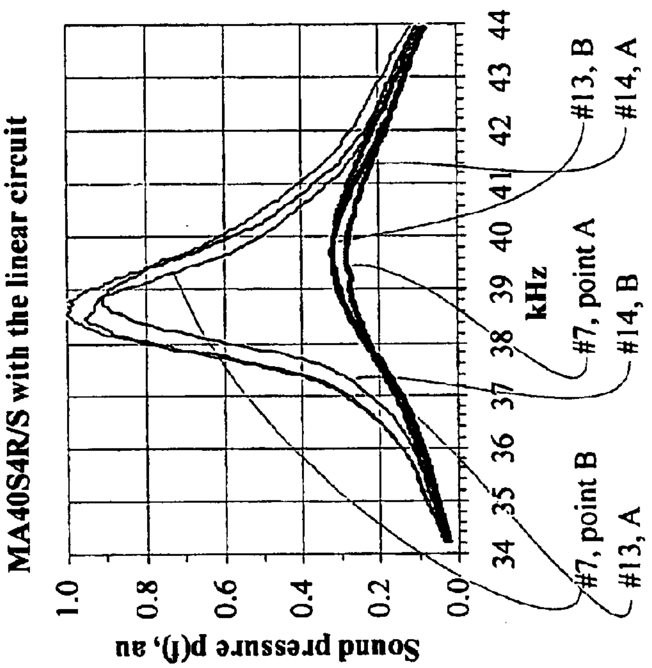
FIG. 36 shows a graph of the sound pressure vs. input frequency applied to points A or B of the schematic in FIG. 34.
Figure 35:
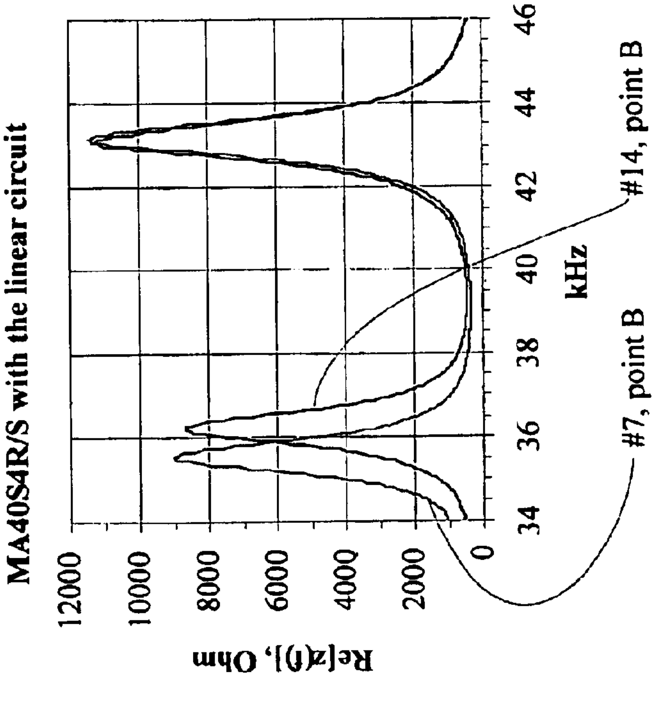
FIG. 35 shows a graph of the input impedance of the circuit loaded on the transducer at point B of the schematic in FIG. 34.
Figure 37:
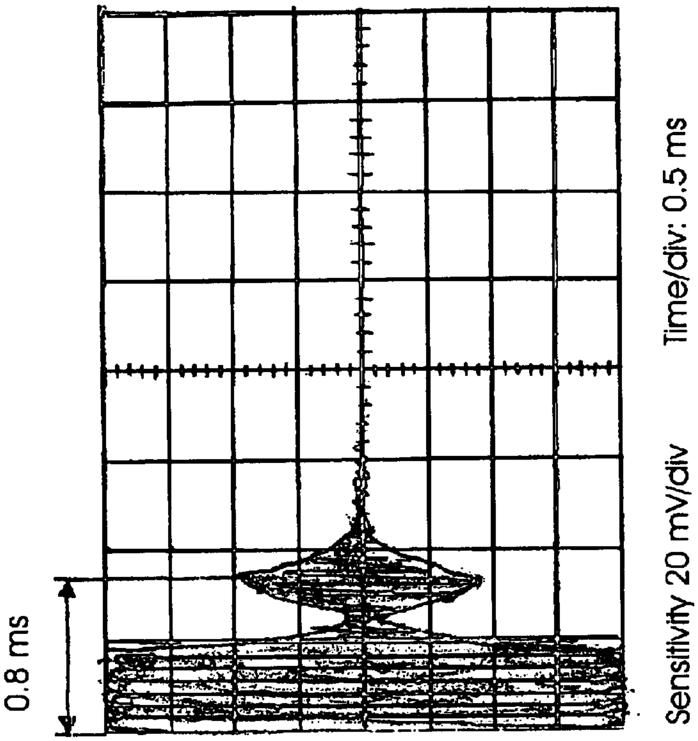
FIG. 37 is a view of the oscilloscope display observed when ringing is measured.

The linear circuit discussed above was investigated experimentally. For measurement convenience, it was realized in a non-differential version (shown in FIG. 34 and designated the "Circuit"). Its complex input impedance, relative sound pressure while input was applied to points A or B, and ringing duration have been measured for three transducers (## 7, 13, 14) arbitrarily selected from the sample of 10 units whose averaged characteristics were used in calculations (see above). Input impedance was measured by means of a Network Analyzer HP3577A. Sound pressure was measured at the distance of 30 cm with the ¼" microphone. Absolute measurements were not made, rather, only comparative characteristics at different input points A/B were obtained. Ringing duration and the signal reflected back from a target (2" disk) located at the distance about 10 cm were measured with the measurement setup shown in FIG. 34 at tone burst input of 20 Vpp and 0.2 ms duration. No additional diodes or resistors at the gated amplifier output and at oscilloscope input were used. Obtained frequency characteristics are presented in FIGS. 35 and 36. A typical view on the oscilloscope display while the ringing was measured is presented in FIG. 37. Measured signals parameters are collected in Table 1.

TABLE 1

| Transducer # | Operating frequency, kHz | Signal, reflected from the target, mVpp | Delay time, ms | Distance to the target, cm |
|---|---|---|---|---|
| 7 | 38.67 | 60 | 0.8 | ≦10 |
| 13 | 39.57 | 80 | 0.8 | ≦10 |
| 14 | 39.20 | 70 | 0.8 | ≦10 |

Both input impedance z(f) and sound pressure p(f) characteristics show a broadband bandwidth of the device. The sound pressure plot has a linear scale, it illustrates that the bandwidth widening and simultaneous reduction of acoustic output: sound pressure has been reduced by about three times, that is, by about 10 dB. Nevertheless, as one can see in FIG. 37, signals reflected back from a target, were not very small: on the order of about 70 mVpp. Hence, they can be easily detected when the target was located at the distance of about 10 cm and even less, that is, the observed ringing duration did not exceed 0.6 ms. Data presented in Table 1 confirm the observations.

Thus, the circuit under consideration gives good results demonstrating that even the simplest linear electrical circuit of the second order can suppress ringing of the Murata dual-function transducers to a required level and provide reliable detection of signals reflected from targets located nearer 10 cm. From the experiments, another important conclusion follows that the manufactures tolerances do not prevent obtaining acceptable ringing with the same electrical circuit for different samples of the Murata transducers.

In sum, as discussed above, non-linear and linear electrical circuits for ringing suppression of the Murata transducers were investigated. The linear circuit has been designed on the basis of the Fano theory of the broadband matching of arbitrary impedance. The approach has been developed to improve its transient function and get a necessary ringing reduction. Input impedance of the dual-function transducers MA40S4R/S has been measured and used to build the transducer model. The Spice models of the circuits and transducers were built and simulated using the MicroSim® LabDesign software.

From simulation results, one can conclude the following:

- both linear and non-linear circuits provide a transducer ringing suppression to a required level.

The ringing suppression is of such value that received signals could be easily detected at time of 0.7–0.9 ms (non-linear and linear ones correspondingly); and

- the non-linear circuit gives better results than the simplest linear one of the second order.

Characteristics of the linear circuit can be improved with additional non-linear components. The linear circuit was built and examined experimentally. From experimental results one can conclude that:

- even the simplest linear electrical circuit of the second order gives good results. It can suppress ringing of the Murata dual-function transducers to a required level and provide reliable detection of signals reflected from targets located nearer 10 cm. In this case, the received signal level is about 70 mVpp;
- the manufactures tolerances do not prevent from getting acceptable ringing with the same electrical circuit for different samples of the Murata transducers.

Figure 38:
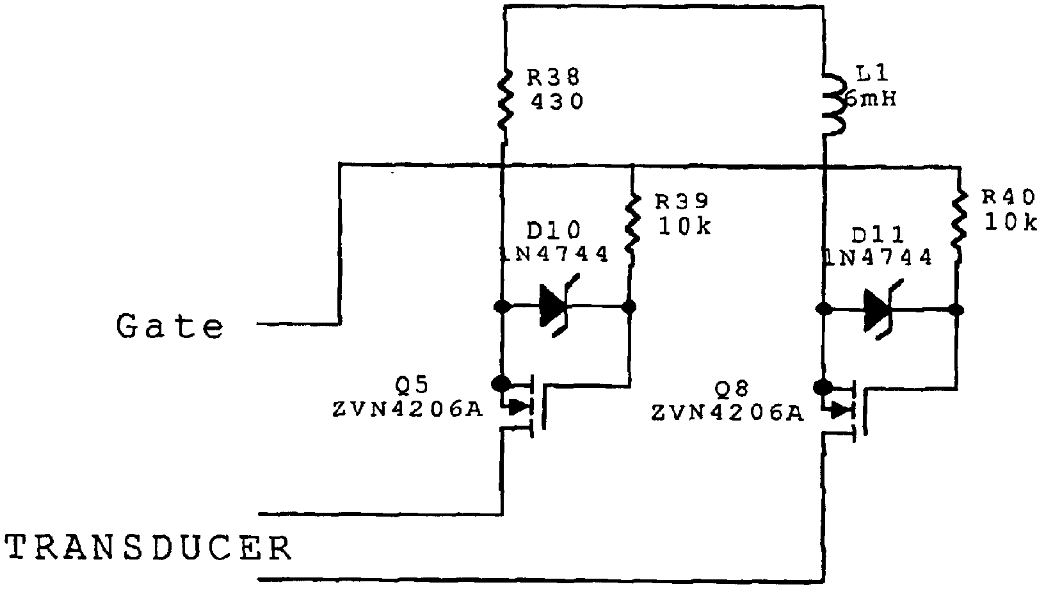
FIG. 38 is a circuit diagram of another embodiment of the invention additionally containing switching means for switching in and out of the reactive components.

FIG. 38 is a circuit diagram of another embodiment of the invention wherein a switching device such as a gate is provided to enable switching between a plurality of circuits formed by electrical components. In this circuit, a gate signal turns on transistors Q5 and Q8 during the ring down time. Inductor L1 and Resistor R38 are switched across the transducer during the ring down time. Inductor L1 and Resistor R38 are disconnected from the transducer during echo time so that the signal will not be attenuated. The gate is controlled or timed by a microprocessor, not shown.

Generally, a circuit with a switch such as shown in FIG. 38 is simpler and less expensive than a circuit designed using Fano's theory. As discussed above, a circuit using Fano's theory is one in which the best matching components are found for both the transmission of an ultrasonic pulse and reception of an ultrasonic pulse. The objective is to eliminate the ringing without losing sensitivity.

In the circuit shown in FIG. 38, as soon as the transmission of the ultrasonic pulse is finished, the switched is activated to alter the circuit during the reception time. Once the reception time is complete, or when the next transmission is to be sent, the switch is again activated to alter the circuit back to the transmission circuit. Thus, two circuits are provided, one operative during transmission and the other during reception. These circuits may be formed from two sets of components without duplication, one set of components wherein some are removed from one or each of the circuits to provide the different circuits, or one set of components wherein the characteristics of the components are variable, e.g., a variable resistor.

In light of the circuit shown in FIG. 38, a method for reducing ringing of dual-function ultrasonic transducers would comprise the steps of providing a plurality of electrical components at least of which is capable of providing inductance, coupling a switching device with the components to enable the construction of at least a first circuit and a second circuit depending on the status of the switching device, selectively coupling the components to the transducer such that the inductance-providing component is in series and/or in parallel with the transducer, and controlling the switching device in conjunction with the operation of the transducer such that the first circuit is coupled to the transducer during a transmission mode of the transducer and the second circuit is coupled to the transducer during the reception mode of the transducer. In this manner, the objective of obtaining a decreased dead zone of the transducer can be realized.

In other words, one electrical reactive circuit or network may be switched on during the setting time and then switched out. If the network is left switched in after the setting time, then the gain in the receive mode is greatly reduced. Thus, one advantage of switching the transmission network out during the reception mode is that reductions in gain are substantially avoided.

In sum, the present invention relates to the design and construction of electrical circuits to suppress ringing of ultrasonic air-coupled resonant transducers. It is important to appreciate that a significant difference between the invention and prior art discussed above is that in the invention, electrical oscillations at the transducer terminals are analyzed whereas in prior art discussed above, emitted ultrasound pulses are investigated.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

We claim:

1. A method for reducing ringing of dual-function, air-coupled ultrasonic transducers, comprising the steps of:

applying at least one inductance in series and/or in parallel to the transducer electrical terminals to obtain a decreased dead zone of the transducer; and applying at least one passive electrical circuit in series and/or parallel to the inductance; and applying a different electrical passive circuit to the transducer when the transducer is in a transmission mode than when the transducer is in a reception mode.

2. The method of claim 1, wherein the at least one electrical passive circuit is a non-linear circuit.

3. The method of claim 1, wherein the at least one electrical passive circuit is a linear circuit.

4. The method of claim 3, further comprising the step of synthesizing the linear circuit using known input impedance/admittance of the transducer.

5. The method of claim 4, further comprising the step of optimizing the linear circuit on the basis of a broadband matching theory.

6. The method of claim 5, further comprising the step of optimizing the generator output impedance to obtain a predetermined ringing at a given input signal.

7. The method of claim 3, further comprising the step of constructing the linear circuit with a higher order transfer function and including at least one capacitor and at least one inductor.

8. An arrangement for reducing ringing of dual-function, air-coupled ultrasonic transducers, comprising:

a first electrical passive circuit adapted to be coupled to the transducer, said first circuit including at least one inductance adapted to be in series and/or in parallel to the transducer to obtain a decreased dead zone of the transducer;

a second electrical passive circuit adapted to be coupled to the transducer; and switching means for switching between said first and second circuits such that one of said first and second circuits is coupled to the transducer when the transducer is in a transmission mode and the other of said first and second circuits is coupled to the transducer when the transducer is in a reception mode.

9. The arrangement of claim 8, wherein said first circuit further comprising switching means for modifying said first circuit such that a first construction of said first circuit is coupled to the transducer when the transducer is in a transmission mode and a second construction of said first circuit, different from said first construction, is coupled to the transducer when the transducer is in a reception mode.

10. The arrangement of claim 8, wherein said first circuit is a non-linear circuit.

11. The arrangement of claim 8, wherein said first circuit is a linear circuit.

12. The arrangement of claim 11, wherein said linear circuit is synthesized using known input impedance/admittance of the transducer.

13. The arrangement of claim 12, wherein said linear circuit is optimized on the basis of a broadband matching theory.

14. The arrangement of claim 13, wherein the generator output impedance is optimized to obtain a predetermined ringing at a given input signal.

15. The arrangement of claim 11, wherein said linear circuit is constructed with a higher order transfer function and includes at least one capacitor and at least one inductor.

16. A method for reducing ringing of dual-function ultrasonic, air-coupled transducers, comprising the steps of:

providing a plurality of electrical components at least one of which is capable of providing inductance;

coupling a switching device with the components to enable the construction of at least a first circuit and a second circuit depending on the status of the switching device;

selectively coupling the components to the transducer such that the inductance-providing component is in series and/or in parallel with the transducer; and controlling the switching device in conjunction with the operation of the transducer such that the first circuit is coupled to the transducer during a transmission mode of the transducer and the second circuit is coupled to the transducer during the reception mode of the transducer to obtain a decreased dead zone of the transducer.

17. A method for reducing ringing of dual-function, air-coupled ultrasonic transducers, comprising the steps of:

applying at least one inductance in series and/or in parallel to the transducer electrical terminals to obtain a decreased dead zone of the transducer; and applying at least one passive electrical circuit in series and/or parallel to the inductance, the at least one electrical passive circuit being a linear circuit; and synthesizing the linear circuit using known input impedance/admittance of the transducer.

18. The method of claim 17, further comprising the step of optimizing the linear circuit on the basis of a broadband matching theory.

19. The method of claim 18, further comprising the step of optimizing the generator output impedance to obtain a predetermined ringing at a given input signal.

20. A method for reducing ringing of dual-function, air-coupled ultrasonic transducers, comprising the steps of:

applying at least one inductance in series and/or in parallel to the transducer electrical terminals to obtain a decreased dead zone of the transducer; and applying at least one passive electrical circuit in series and/or parallel to the inductance, the at least one electrical passive circuit being a linear circuit; and constructing the linear circuit with a higher order transfer function and including at least one capacitor and at least one inductor.

21. An arrangement for reducing ringing of dual-function, air-coupled ultrasonic transducers, comprising:

a first electrical passive circuit adapted to be coupled to the transducer, said first circuit including at least one inductance adapted to be in series and/or in parallel to the transducer to obtain a decreased dead zone of the transducer;

said first circuit further comprising switching means for modifying said first circuit such that a first construction of said first circuit is coupled to the transducer when the transducer is in a transmission mode and a second construction of said first circuit, different from said first construction, is coupled to the transducer when the transducer is in a reception mode.

22. An arrangement for reducing ringing of dual-function, air-coupled ultrasonic transducers, comprising:

a first electrical passive circuit adapted to be coupled to the transducer, said first circuit including at least one inductance adapted to be in series and/or in parallel to the transducer to obtain a decreased dead zone of the transducer, said first circuit being a linear circuit, said linear circuit being synthesized using known input impedance/admittance of the transducer.

23. The arrangement of claim 22, wherein said linear circuit is optimized on the basis of a broadband matching theory.

24. The arrangement of claim 23, wherein the generator output impedance is optimized to obtain a predetermined ringing at a given input signal.

25. An arrangement for reducing ringing of dual-function, air-coupled ultrasonic transducers, comprising:

a first electrical passive circuit adapted to be coupled to the transducer, said first circuit including at least one inductance adapted to be in series and/or in parallel to the transducer to obtain a decreased dead zone of the transducer, said first circuit being a linear circuit, said linear circuit being constructed with a higher order transfer function and includes at least one capacitor and at least one inductor.

26. A dampening circuit for reducing ringing of dual-function, air-coupled ultrasonic transducers having a ring down time and an echo time, comprising:

a resistor;

an inductor connected in series with said resistor; and a switching device arranged to switch said resistor and said inductor into a circuit with the transducer during the ring down time and out of circuit with the transducer during the echo time.

27. A method for reducing ringing of dual-function ultrasonic, air-coupled transducers, comprising the steps of:

providing a plurality of electrical components having variable characteristics, the electrical components including an inductor and a resistor;

coupling the components to the transducer such that the inductor and resistor are in series and/or in parallel with the transducer; and controlling the characteristics of the electrical components in conjunction with the operation of the transducer such that a first circuit having specific characteristics is coupled to the transducer during a transmission mode of the transducer and a second circuit having different characteristics than the first circuit is coupled to the transducer during the reception mode of the transducer to obtain a decreased dead zone of the transducer.

* * * * *